United States Patent [19]

Toyoda

[11] Patent Number: 4,465,365
[45] Date of Patent: Aug. 14, 1984

[54] PRINTER

[75] Inventor: Seiichi Toyoda, Wakayama, Japan

[73] Assignee: Noritsu Kenkyu Center Co., Ltd., Wakayama, Japan

[21] Appl. No.: 467,334

[22] Filed: Feb. 17, 1983

[30] Foreign Application Priority Data

Feb. 18, 1982 [JP] Japan .................................. 57-23649
Dec. 21, 1982 [JP] Japan ........................... 57-192241[U]
Dec. 21, 1982 [JP] Japan ........................... 57-192242[U]

[51] Int. Cl.³ .......................................... G03B 13/28
[52] U.S. Cl. .................................................. 355/45
[58] Field of Search ...................... 355/43, 45, 60, 65, 355/66, 57

[56] References Cited

U.S. PATENT DOCUMENTS 2,927,503  4/1955  Zollinger .............................. 355/60
3,898,003  8/1975  Aronson et al. ...................... 355/43

Primary Examiner—L. T. Hix
Assistant Examiner—Brian W. Brown
Attorney, Agent, or Firm—William E. Jackson

[57] ABSTRACT

An improved printer of the type including an exposing and printing box in which a strip of printing paper is intermittently introduced into an exposing section in the downward direction substantially in parallel to the optical axis of light beam coming down from a light beam source is disclosed. A mirror fixedly mounted on a turnable mirror support is disposed at the position located in the proximity of the bottom of a trimming dark box so as to allow the direction of propagation of light beam to be changed toward the exposing section at a right angle relative to the optical axis of light beam in the trimming dark box. Thus, the printer is designed to have the substantially same width as that of the conventional ones but a remarkably reduced length compared with that of the conventional ones. Trimming operation is easily carried out by turning the mirror support away from the optical axis of light beam until it shuts a light beam guide opening formed on a partition between the trimming dark box and the exposing and printing dark box.

6 Claims, 28 Drawing Figures

PRINTER

BACKGROUND OF THE INVENTION

The present invention relates to a printer that is generally called an automatic photograph printing machine and more particularly to an improved printer which has a remarkably reduced length in spite of the substantially same width as that of the conventional printers and is connectable to an automatic developing machine and a drier in series which constitute a complete set of photograph treatment system in conjunction with the printer while a reduced length is assured therefor.

The conventional printer that is called an automatic photograph printing machine especially designed for mass treatment has been hitherto constructed in a table type. Specifically, the conventional printer is constructed such that a roll of photosensitive paper, that is, a roll of printing paper is fitted on a support shaft at the fore end part of a dark box constituting a substantial part of the printer, a strip of printing paper uncoiled from the roll is intermittently forwarded toward a coiling section located at the rear end part of the dark box and printing is then effected at the central part of the dark box while the printing paper is caused to stop. Because of the structure of the printer in the table type as described above a possibility for designing the printer or the dark box in a shorter length is restricted within a certain limit, thus resulting in wide area or space required for installing the printer. It is often found that the requirement for wide area or space becomes a serious problem to many users of the printers. This trend of requirement for wider area or space is distinctly recognized particularly in case where the printer and other treatment sections are arranged in series in the longitudinal direction in the photographic system so that all photographic treatment steps including printing, developing and drying are carried out in a single line. In view of the above-mentioned facts requests for designing and constructing a printer and other associated sections in smaller dimensions have been presented to manufacturers specializing in manufacturing printers and other photographic treatment machines and equipments.

SUMMARY OF THE INVENTION

The present invention is intended to obviate the drawbacks as described above with respect to the conventional printers.

The present invention consists in an improvement which is achieved such that a strip of printing paper is intermittently introduced into an exposing section in the downward direction substantially in parallel to the optical axis of light beam coming down in a trimming dark box from a light beam source and a mirror adapted to move into or away from the optical axis of light beam is disposed at the lower part of the dark box so as to change the direction of propagation of light beam toward the printing paper firmly held in the exposing section. Owing to the above-described improvement it is assured that the printer has a remarkably reduced length in spite of the substantially same width as that of the conventional printers. Further, owing to the arrangement that the mirror disposed in the trimming dark box is adapted to turn away from the optical passage of light beam it is assured that trimming operation is very easy to be carried out.

Thus, it is an object of the present invention to provide a printer of the type in which a roll of printing paper is intermittently subjected to automatic printing in an exposing and printing dark box which has a length substantially less than that of the conventional printers in spite of the substantially same width as that of the conventional ones.

It is another object of the present invention to provide a printer having a reduced length in which trimming and printing operation are easy to be carried out.

It is a further object of the present invention to provide a printer which can be arranged in series in conjunction with an automatic developing machine, a drier and others.

Other objects, features and advantages of the present invention will become readily apparent by reading the following description made in conjunction with the accompanying drawings.

BRIEF DESCRIPTION OF THE DRAWINGS

The accompanying drawings illustrating three preferred embodiments of the present invention will be briefly described below.

FIGS. 1 to 12 illustrate a printer in accordance with the first embodiment of the present invention in which;

FIG. 1 is a perspective view of the whole printer.

FIG. 2 is a fragmental perspective view of the printer, shown in an enlarged scale.

FIG. 3 is a schematic vertical sectional view of the printer.

FIG. 4 is a vertical sectional view of negative film mask holding discs and associated components, illustrating how a negative film mask is inserted and held.

FIG. 5 is a vertical sectional view of a part of the printer including an optical density determining window and associated components.

FIG. 6 is a plan view of a part of the negative film mask in FIG. 4.

FIG. 7 is a side view of a mirror support actuating mechanism, illustrating the positional relation of components during exposing and printing.

FIG. 8 is a side view similar to FIG. 7, illustrating the positional relation of the components during trimming.

FIG. 9 is a front view of the mirror support actuating mechanism in FIG. 7.

FIG. 10 is a perspective view of an exposing section in the printer with a pair of folding door-shaped guide plates held in a half opened state.

FIG. 11 is a cross-sectional view of the exposing section in FIG. 10 with the folding door-shaped guide plates held in a fully opened state.

FIG. 12 is a cross-sectional view of the exposing section in FIG. 10 with the folding door-shaped guide plates held in a fully closed state.

FIGS. 13 to 18 illustrate a printer in accordance with the second embodiment of the present invention in which;

FIG. 13 is a partially sectioned front view of an exposing section in the printer, taken in line 13—13 in FIG. 14.

FIG. 14 is a cross-sectional view of the exposing section in the printer, taken in line 14—14 in FIG. 13.

FIG. 15 is a cross-sectional view of a combination of a driving roller and a follower roller, illustrating their positional relation when a solenoid is magnetized and the follower roller is displaced away from the driving roller, shown in an enlarged scale.

FIG. 16 is a cross-sectional view similar to FIG. 15, illustrating the positional relation when the solenoid is demagnetized and the follower roller comes in contact with driving roller with a printing paper held therebetween.

FIG. 17 is a fragmental perspective view of a frame structure, schematically illustrating where and how sensors are mounted thereon for detecting movement of slidable printing paper guide plates.

FIG. 18 is a schematic vertical sectional view of the printer.

FIGS. 19 to 28 illustrate a printer in accordance with the third embodiment of the present invention in which;

FIG. 19 is a front view of an exposing section.

FIG. 20 is a cross-sectional view of the exposing section, taken in line 20—20 in FIG. 19.

FIG. 21 is a front view of a part of the exposing section including a printing paper thrusting member.

FIG. 22 is a vertical sectional view of the exposing section, taken in line 22—22 in FIG. 21.

FIG. 23 is a cross-sectional view of the exposing section, taken in line 23—23 in FIG. 21.

FIGS. 24 to 26 illustrate a modification from the preceding embodiment as illustrated in FIGS. 19 to 23 in which;

FIG. 24 is a front view of an exposing section.

FIG. 25 is a vertical sectional view of the exposing section, taken in line 25 to 25 in FIG. 24.

FIG. 26 is a cross-sectional view of the exposing section taken in line 26—26 in FIG. 24, shown in an enlarged scale.

FIG. 27 is a schematic vertical sectional view of the printer, and

FIGS. 28(i), (ii), (iii) and (iv) are a schematic vertical sectional view of the exposing section respectively, illustrating how a printing paper thrusting member is displaced in the vertical direction with respect to the position of a sheet of printing paper to be delivered to a processor.

DETAILED DESCRIPTION OF THE PREFERRED EMBODIMENTS

Now the present invention will be described in a greater detail hereunder with reference to the accompanying drawings which illustrate three preferred embodiments of the present invention.

Figure 1:
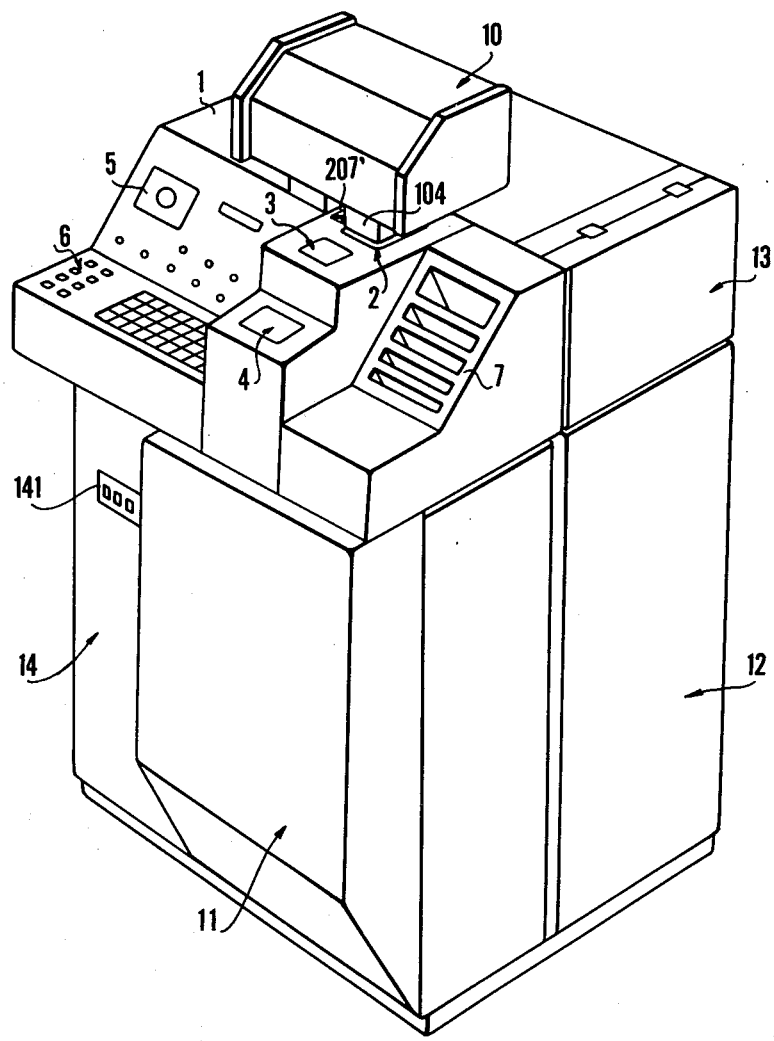
Figure 2:
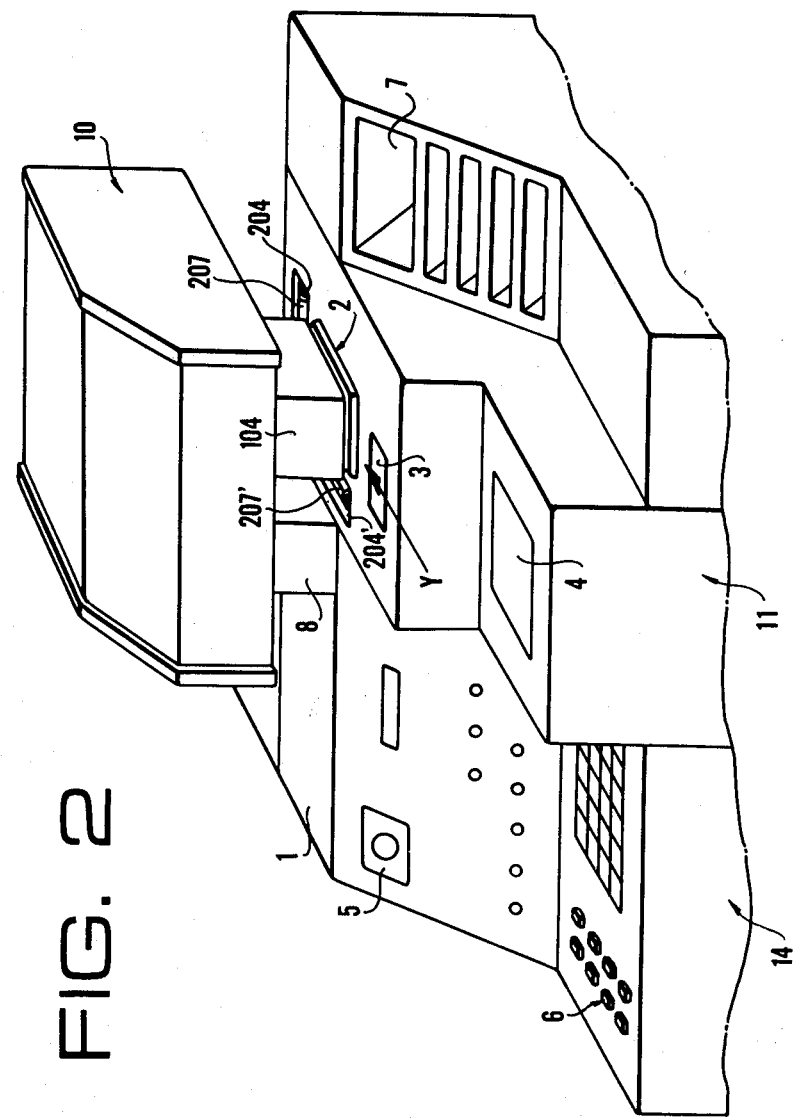

First, description will be made as to a printer in accordance with the first embodiment of the present invention with reference to FIGS. 1 and 2, wherein FIG. 1 is a perspective view of the printer illustrating the whole configuration thereof and FIG. 2 is a partial perspective view of the printer in FIG. 1. shown in an enlarged scale. In the drawings reference numeral 1 designates an upper board on which a plurality of essential components including a negative film mask attachment section 2, an optical density determining window 3, a trimming window 4, a control panel 5, a keyboard 6 and pockets 7 are provided. Specifically, the negative film mask attachment section 2 has stoppers 207 and 207' for a negative mask 15; the density determining window 3 is adapted to be capped with a hood (not shown) and serves to make determination as to whether or not a negative film has proper density and no color failure; the trimming window 4 is adapted to be also capped with a hood (not shown); the control panel 5 includes a control dial and others for controlling the printer; the keyboard 6 is equipped with a number of keys each of which is effective in operating the printer; and the pockets 7 are used for containing therein negative masks and other small articles. Further, the upper board 1 includes a support column 8 standing upright therefrom on which a mirror tunnel 104 located just above the negative film mask attachment section 2 and a light beam source box 10 are firmly supported. Reference numeral 11 designates a dark box in which trimming operation is to be practiced, wherein the upper board 1 constitutes a part of the dark box 11. Reference numeral 12 designates a dark box in which exposing and printing are to be practiced for a sheet of printing paper and which is located behind the dark box 11 in a side-by-side relation. Reference numeral 13 designates another dark box in which a roll of printing paper to be printed is contained and which is located behind the dark box 11 and above the dark box 12. Further, reference numeral 14 designates a control box which is located below the upper board 1 and adjacent to the dark box 11 at the left side as seen from the front. The control box 14 includes a switch panel 141 on which a main switch and others are arranged for operating the printer and a main electric circuit is incorporated in the control box 14 so as to control starting, running and stopping of the printer.

It should be noted that the upper board 1, the dark box 11 for trimming, the dark box 12 for exposing and printing and the dark box 13 for containing a roll of printing paper therein are integrated with one another in such a manner as to prevent light beam from entering their interior from the outside and an interface between the dark boxes 11 and 12 is caused to shut by way of steps to be described later only when trimming is practiced.

Next, parts and components constituting the printer will be described in more details as to their construction with reference to FIGS. 3 to 12.

First, description will be made as to the light beam source box 10 particularly with reference to FIGS. 3 and 4. The light beam source box 10 is constructed by a combination of a light beam source 101, light adjusting filters 102, cut filters 103 disposed adjacent to a shutter (not shown) and a mirror tunnel 104 each of which is designed and constructed in the substantially same manner as the conventional ones, and the first embodiment of the invention consists in that an upper negative film mask holding disc 105 is disposed for the negative film mask 15 at the lower end part of the mirror tunnel 104, said holding disc 105 having several pieces of permanent magnets 106 embedded therein against which a negative film retainer 1510 to be described later is adapted to come in abutment.

Figure 4:
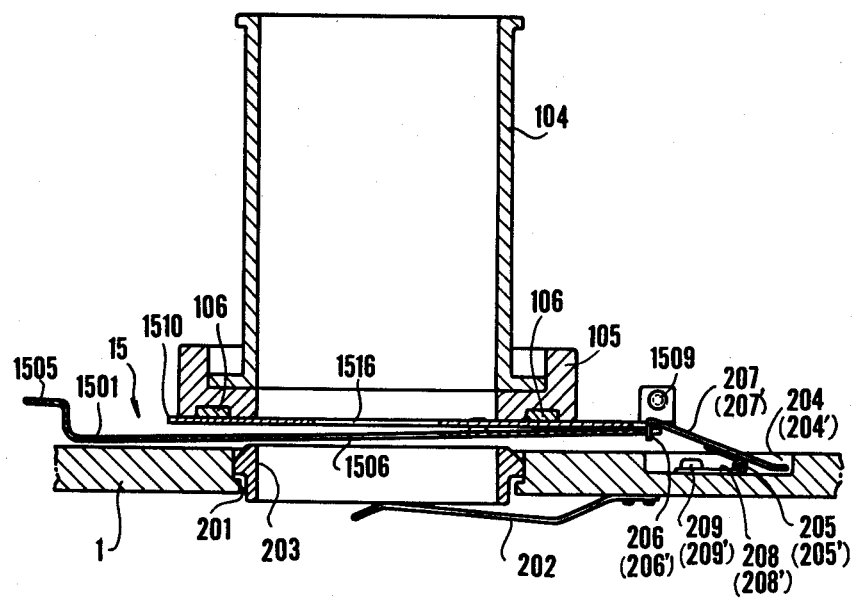
Figure 5:
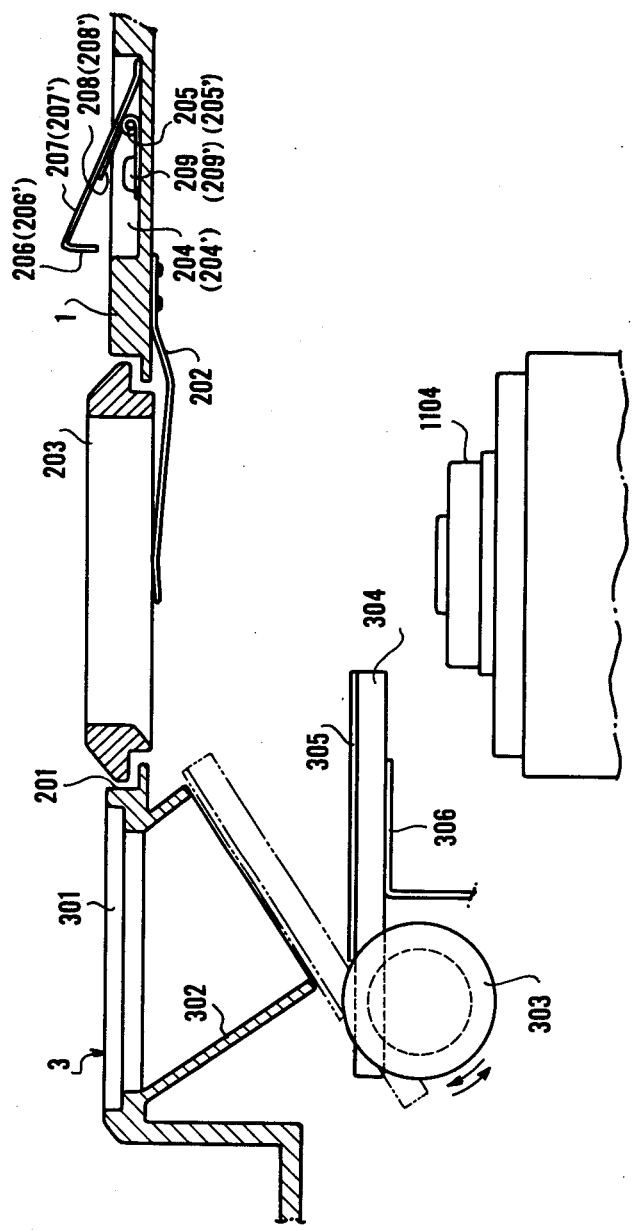

Next, description will be made as to the negative film mask attachment section 2 particularly with reference to FIGS. 4 and 5. As is apparent from the drawings, the upper board 1 has a stepped opening 201 formed therethrough in which a lower negative film mask holding disc 203 serving as a holding disc for holding a negative film mask with an opening formed thereon for exposing and printing is fitted, said holding disc 203 being normally urged to come in contact with the upper holding disc 105 under the influence of resilient force imparted by means of two leaf springs 202 (one of them being not shown in the drawing) of which one end is fixed to the bottom surface of the upper board 1 and of which other free end is operatively abutted against both the bottom surface of the lower holding disc 203 located opposite to one another relative to the opening 201. As is best seen from FIG. 2, a recessed part 204 is formed on the upper board 1 at the position located behind the mirror tunnel 104 as seen from the direction of inserting the negative film mask 15 (as identified with reference letter Y in FIG. 2) and another recessed part 104' is formed thereon at the position located at the left side relative to the mirror tunnel 104. In the recessed parts 204 and 204' shafts 205 and 205' are extended through the oppositely located side walls of the recessed parts 204 and 204' so as to turnably support negative film mask stoppers 207 and 207' within the space as defined by the recessed parts 204 and 204'. Downward bent portions 206 and 206' of the stoppers 207 and 207' at the free end thereof are normally urged to project above the upper surface of the lower holding disc 203 under the influence of resilient force imparted by means of springs 208 and 208'. Reference numerals 209 and 209' designate a permanent magnet which is effective in holding the stoppers 207 and 207' in the recessed parts 204 and 204'.

Figure 6:
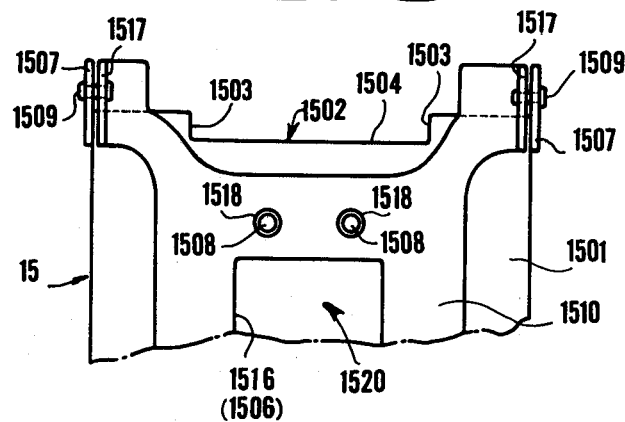

Next, the negative film mask 15 will be described particularly with reference to FIG. 6 and FIG. 4 will help description. Reference numeral 1501 designates a negative film mask body of which rear edge part includes a cutout 1502 defined by side edges 1503 and a bottom edge 1504, said side edges 1503 being brought in sliding contact with both the side edges of the bent portions 206 and 206' of the stoppers 207 and 207' and said bottom edge 1504 coming in abutment against the fore edge of the bent portions 206 and 206' and of which fore edge part is bent upward to form a raised edge portion 1505 which serves for holding and thrusting the negative film mask 15. Reference numeral 1506 designates an opening, reference numeral 1507 does an upright edge portion, reference numeral 1508 does a film guide pin and reference numeral 1509 does a pivotal pin. Further, reference numeral 1510 designates a negative film retaining plate, reference numeral 1516 does an opening, reference numeral 1517 does an upright edge portion formed at the rear part of both the side edge parts of the retaining plate 1510 and reference numeral 1518 does an insert hole through which the film guide pin 1508 is inserted. Thus, both the openings 1506 and 1516 cooperate with one another to form a complete set of exposing and printing opening 1520.

When the negative film mask 15 is inserted and thrusted into the space defined by both the upper and lower holding discs 105 and 203 until the bent portions 206 and 206' of the stoppers 207 and 207' are fitted into the cutout 1502 on the rear edge part of the negative film mask 15 and the latter comes to a stop so that it is kept in the fixed state by magnetically attracting the negative film retainer 1510 onto the upper holding disc 105 with the aid of the permanent magnets 106, it results that the center of the exposing and printing opening 1520 of the negative film mask 15 is located in alignment with the center of the mirror tunnel 104, that is, the optical axis of the same.

After the negative film mask 15 is firmly held at the predetermined position between both the upper and lower holding discs 105 and 203, exposing and printing are ready to be initiated immediately when it is found that the inserted negative film has a normal optical density (correct exposure). As will be readily understood from the above description, inserting or displacing of the negative film is very easy to be effected merely by depressing the raised edge portion 1505 of the negative film mask body 1501 to lower the latter toward the lower holding disc 203. Thus, there is no necessity for practicing the steps of taking a negative film mask from a negative film mask attachment section, raising up a negative film retainer and then inserting or displacing a negative film as is the case with the conventional printer.

It should be noted that the upper negative film mask holding disc 105 as described above in conjunction with the light beam source box 10 may be eliminated as required.

Next, the density determining window 3 will be described in more details particularly with reference to FIGS. 3 and 5. In the drawings reference numeral 301 designates a viewing window formed on the upper board 1 constituting a part of the dark box 11 (a hood to be disposed between the viewing window and the viewer's eye is not shown in FIG. 3), said viewing window being normally covered with a transparent glass plate. Reference numeral 302 designates an inclined light beam guide sleeve which extends from the viewing window 301 and reference numeral 305 does a mirror fixedly secured onto a mirror attachment disc 304 adapted to turn with the aid of a rotary solenoid 303 so that it comes in tight contact with the open end face of the inclined guide sleeve 302. To completely prevent light beam from entering the interior of the dark box 11 from the outside while the mirror 305 comes in contact with the open end face of the inclined guide sleeve 302, the peripheral part of the mirror 305 or the mirror attachment disc 304 should be preferably lined with light beam shielding material which is in turn brought in direct contact with the open end of the inclined guide sleeve 302. Thus, the viewer can observe a negative film on the negative film mask 15 held between both the upper and lower discs 105 and 203, when the mirror 305 is caused to turn away from the end face of the inclined guide sleeve 302 and abutted against a stopper 306.

Next, description will be made as to the dark box 11 and the trimming window 4 particularly with reference to FIGS. 3, 7, 8 and 9. In FIG. 3 reference numeral 1104 designates an exposing and printing lens which is adapted to be vertically displaced in conformance with focussing distance and printing size and reference numeral 1105 does a screen located at the lower part of the dark box 11.

Further, a mirror 1106 and a mirror support 1107 firmly carrying said mirror 1106 thereon are turnably disposed in the dark box 11 in such a manner that they are caused to turn away from the light beam passage extending downward from the lens 1104 toward a partition 1102 between both the dark boxes 11 and 12 to shut a light beam guiding opening 1103 on the partition 1102 when focussing, printing size determining and trimming are carried out using the screen 1105, while they are caused to turn into the light beam passage when exposing and printing are carried out for a sheet of printing paper P' which is delivered into the dark box 12.

Figure 7:
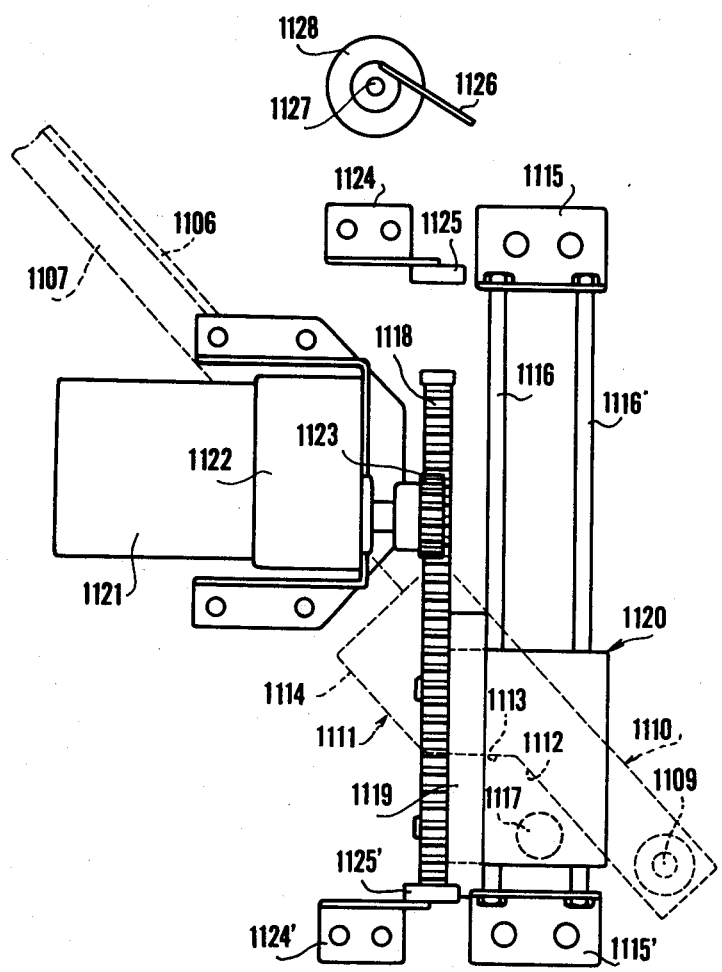
Figure 8:
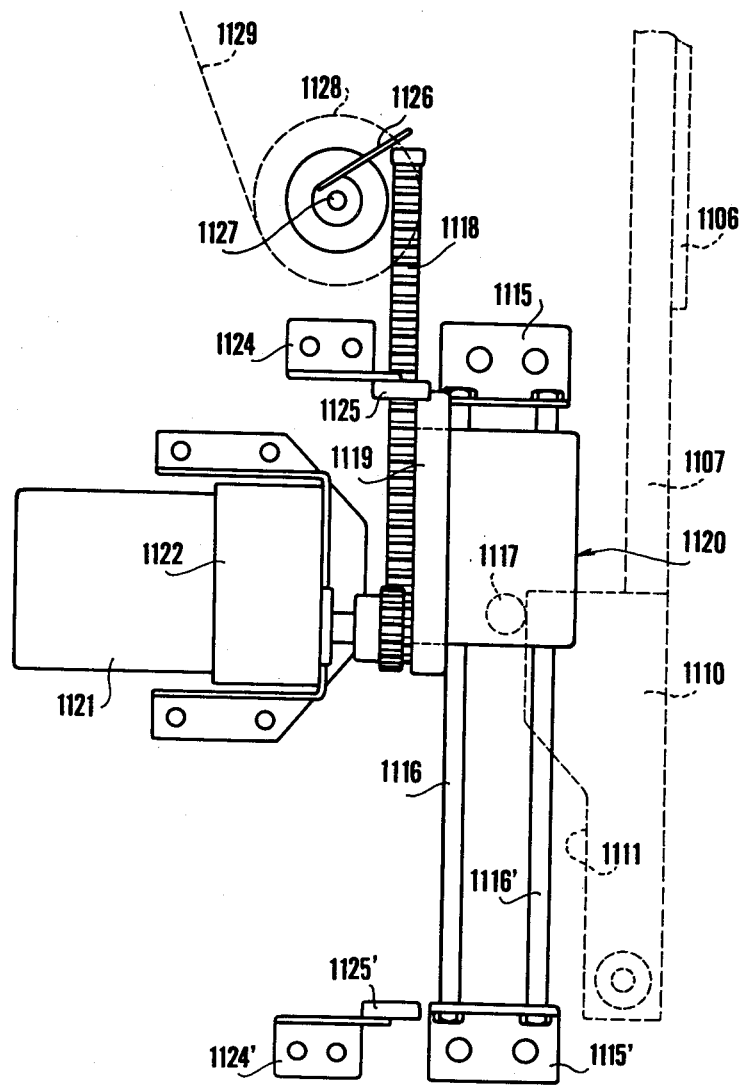
Figure 9:
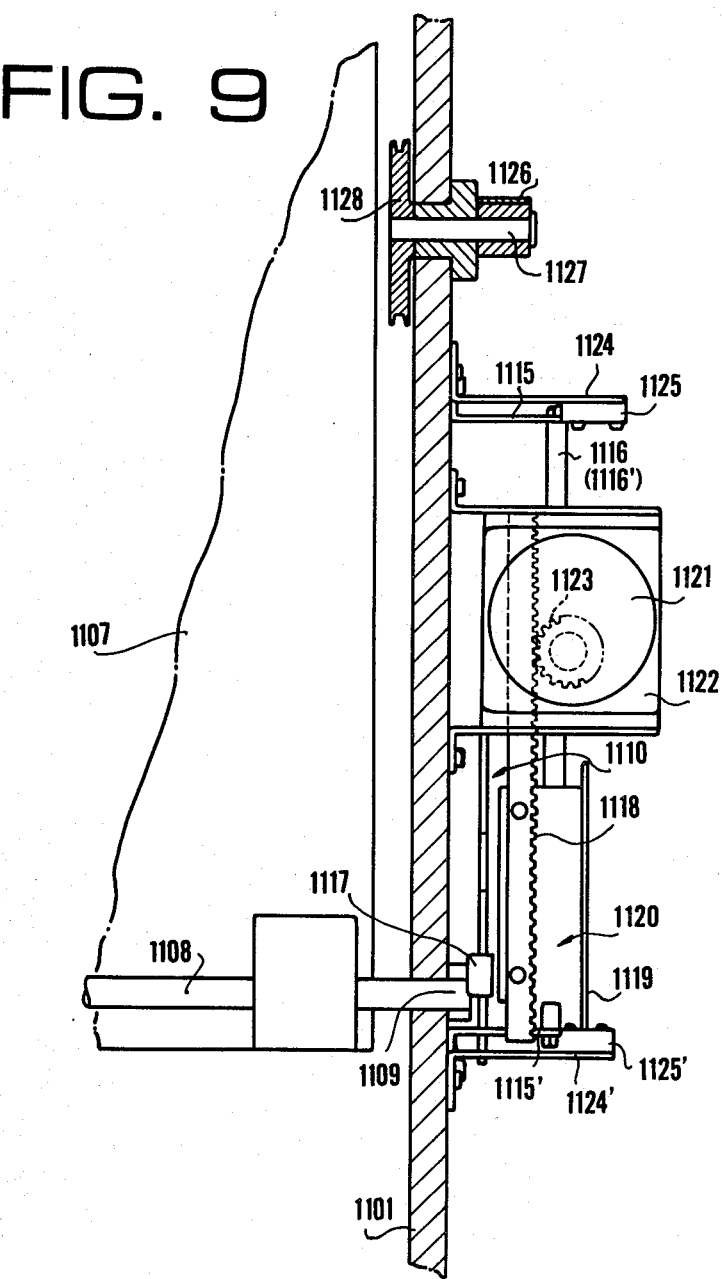

Specifically, the mirror support 1107 includes a shaft 1108 fixedly secured to the lowermost end part thereof which extends through both the side walls 1101 and 1101' (one of them being not shown in the drawing) of the dark box 11 to be rotatably supported thereby, said side walls 1101 and 1101' being located opposite to one another and extending at a right angle relative to the partition 1102. The shaft 1108 has a cam plate 1110 fixedly secured thereto at the outermost end part 1109 located outward of the one side wall 1101, said cam plate 1110 being adapted to turn the mirror support 1107 with the mirror 1106 fixedly mounted thereon. The cam plate 1110 includes a cam face 1111 along the left edge thereof as seen in FIGS. 7 and 8, said cam face 1111 comprising a cam portion 1112 for turning the mirror support 1107 at a lower speed, a cam portion 1113 for turning the same at a higher speed and a cam portion 1114 which does not participate in turning operation, and a roller 1117 to be described later is urged to come in rolling contact with each of the cam portions 1112 to 1114. Further, L-shaped brackets 1115 and 1115′ are fixed to the side wall 1101 in the vicinity of the outermost end part 1109 of the shaft 1108, said L-shaped brackets 1115 and 1115′ being located one after another in vertical alignment so that two guide rods 1116 and 1116′ extend in parallel to one another therebetween in the vertical direction so as to movably carry a block 1120 therealong. The movable block 1120 includes a roller 1117 adapted to come in rolling contact with the cam face 1111 of the cam plate 1110, a rack 1118 meshing with a pinion 1123 and a limit switch actuating plate 1119 adapted to abut against upper and lower limit switches 1125 and 1125′, said pinion 1123 being rotated by a reversible electric motor 1121 fixedly mounted on the side wall 1101 by way of a speed reduction mechanism 1122, while said limit switches 1125 and 1125′ being attached to another L-shaped brackets 1124 and 1124′ located one after another in vertical alignment on the side wall 1101 so as to stop rotation of the reversible motor 1121.

Further, a rotary shaft 1127 with an abutment plate 1126 fixedly secured thereto is rotatably supported on the side wall 1101, said abutment plate 1126 being designed in such a manner as to come in abutment against the top end of the rack 1118 at the position located a little lower than the uppermost positional limit where the rack 1118 stops its upward movement and then turn in the anticlockwise direction against resilient force of a spring means (not shown). The rotary shaft 1127 has a pulley 1128 fixedly mounted on its inner end part which is located inside the dark box 11, said pulley 1128 carrying a wire rope 1129 which extends toward a pulley (not shown) on a pivotal shaft 404 via a tension pulley (not shown) located midway of the spanned length of the wire rope 1129, said pivotal shaft 404 being fixedly secured to one end part of a cover plate 403 to turn the same so as to open or close an opening 401 of the trimming window 4 fitted with a transparent plate 402 made of glass or the like material. When the cover plate 403 assumes the position as illustrated by real lines in FIG. 3 (corresponding to the position in FIG. 8), the mirror support 1107 is caused to turn away from the passage of exposing and printing light beam and comes in tight contact with the partition 1102 to shut the light beam guide opening 1103 whereby a viewer can not only observe an image of the negative film projected on the screen 1103 through the opening 401 of the window 4 but also carry out trimming operation.

Figure 3:
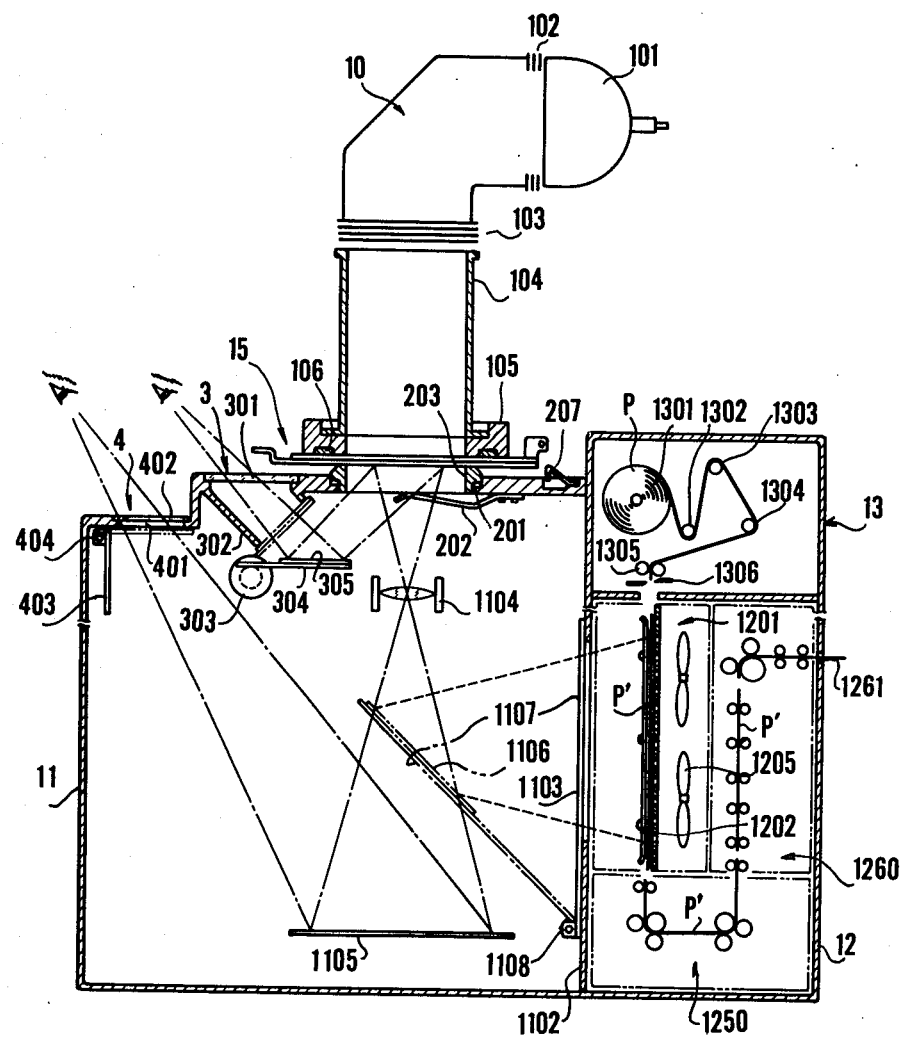

On the other hand, when the mirror support 1107 assumes the position as illustrated by two-dot chain lines in FIG. 3 where the mirror support 1107 has turned in the anticlockwise direction so as to enter the passage of exposing and printing light beam (corresponding to the position in FIG. 7) after the cover plate 403 is caused to turn in the anticlockwise direction to close the opening 401 of the window 4, the light beam passage is directed toward the dark box 12 which is located behind the dark box 11 in the side-by-side relation.

The dark box 12 includes an exposing section 1201 in which a sheet of printing paper P′ delivered from the dark box 13 for holding a roll of printing paper P therein is subjected to exposing and printing while it is supported, a higher speed transporting section 1250 and a lower speed transporting section 1260. The lower speed transporting section 1260 is designed such that its operating speed match to the processing speed of the printing paper P′ in a processor (not shown) which is operatively jointed to the dark box 12. It should be noted that each of the above-mentioned sections 1201, 1250 and 1260 can be assembled in or disassembled from the dark box 12 after one of the side walls constituting the dark box 12 is disconnected therefrom.

Description will be first made as to the exposing section 1201. Reference numeral 1202 designates a vertical printing paper supporting and guiding plate with a large number of air passage holes 1203 formed thereon. The guide plate 1202 is vertically held in a frame structure 1204 so as to support the printing paper P′ during exposing and printing and the distance measured from the lens 1104 with the mirror 1106 disposed therebetween is usually dimensioned substantially equal to the distance between the lens 1104 and the screen 1105. Further, reference numeral 1205 designates a fan located behind the vertical guide plate 1202 for drawing the printing paper P′ toward the fore surface of the guide plate 1202 under reduced pressure in the exposing section 1201.

Figure 11:
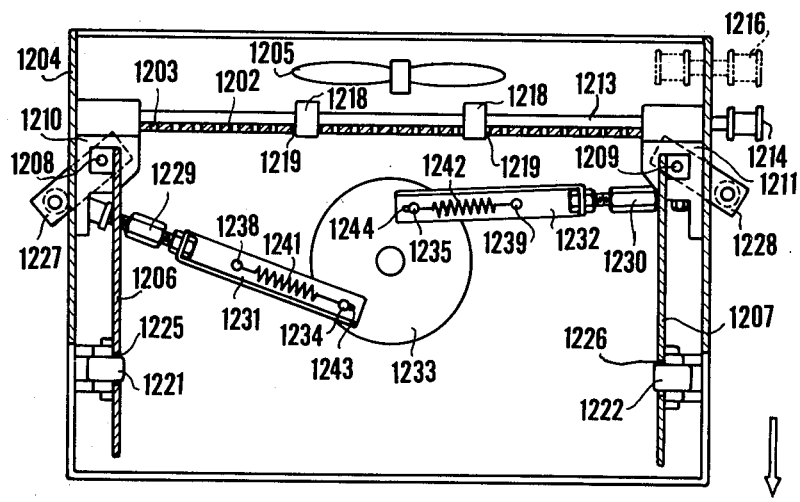

Reference numerals 1206 and 1207 designate a pair of folding door-shaped guide plate located before the vertical guide plate 1202 in the proximity of the latter. Specifically, the folding door-shaped guide plate 1206 is opened away from the vertical guide plate 1202 by turning in the clockwise direction, whereas the folding door-shaped guide plate 1207 is opened by turning in the anticlockwise direction as seen in FIG. 11. The folding door-shaped guide plates 1206 and 1207 include vertically extending support shafts 1208 and 1209 at their base end part which are rotatably held by means of upper and lower bearings 1210 and 1211 fixedly secured to the side walls of the frame structure 1204. Reference numeral 1212 designates a slot-shaped printing paper guide passage formed between the vertical guide plate 1202 and the folding door-shaped guide plates 1206 and 1207 through which the printing paper P′ moves downward.

Reference numeral 1213 designates horizontally extending rotary shafts arranged in parallel to one another along the rear surface of the vertical guide plate 1202 in a spaced relation. The rotary shafts 1213 are rotatably supported on the side walls of the frame structure 1204 and have a pulley 1214 fixedly mounted on their outermost end part located outward of the frame structure 1204. As will be apparent from FIG. 10, each of the rotary shafts 1213 is rotated by a combination of pulleys 1214, an endless timing belt 1215, a driving pulley 1216, an endless driving belt 1217 and a driving electric motor (not shown). Reference numeral 1218 designates a driving roller firmly fitted onto each of the rotary shafts 1213. A part of the driving roller 1218 is projected into the printing paper guide passage 1212 through an opening 1219 formed on the vertical guide plate 1202 by a very short distance until it abuts against the rear surface of the printing paper P′ in the guide passage 1212.

On the other hand, reference numerals 1221 and 1222 designate a follower roller respectively which is disposed on both the folding door-shaped guide plates 1206 and 1207 at the position corresponding to the driving rollers 1218 on the vertical guide plate 1202. The follower rollers 1221 and 1222 are rotatably supported on the door-shaped guide plates 1206 and 1207 by means of bearings disposed on the rear surface of the door-shaped guide plates 1206 and 1207 (as seen from the printing paper guide passage 1212). A part of the follower rollers 1221 and 1222 is also projected into the printing paper guide passage 1212 through openings 1225 and 1226 formed on both the folding door-shaped guide plates 1206 and 1207.

Thus, the printing paper P' is caused to move downward through the printing paper guide passage 1212 by means of a combination of the driving rollers 1218 and the corresponding follower rollers 1221 and 1222 and after completion of exposure it is taken out of the guide passage 1212.

Further, turnable arms 1227 and 1228 fixedly secured to the lowermost end part of the support shafts 1208 and 1209 to turn the folding door-shaped guide plates 1206 and 1207 are operatively connected to pins 1234 and 1235 on a reciprocable rotary disc 1233 via turnbuckles 1229 and 1230 and connector plates 1231 and 1232, said pins 1234 and 1235 being located at the eccentric position relative to the center of the reciprocable rotary disc 1233 which is designed so as to rotate in both the clockwise and anticlockwise directions within the range of about 90 degrees with the aid of a reversible electric motor 1237 of which power output is transmitted to the reciprocable rotary disc 1233 via a speed reduction gear box 1236.

Specifically, an actuating mechanism for opening or closing the folding door-shaped guide plates 1206 and 1207 is constructed by a combination of the turnable arms 1227 and 1228, the turnbuckles 1229 and 1230, the connector plates 1231 and 1232, the pins 1234 and 1235, the reciprocable rotary disc 1233, the speed reduction gear box 1236 and the reversible electric motor 1237. It should be noted that switches for the reversible electric motor 1237 and switches for the electric motor (not shown) for rotating the driving rollers 1218 are automatically turned on or off so that the actuating mechanism opens or closes the folding door-shaped guide plates 1206 and 1207 in association with stop or start of rotation of the driving rollers 1218.

Reference numerals 1238 and 1239 designate an engagement pin vertically attached to the connector plates 1231 and 1232. Tension springs 1241 and 1242 are spanned between the pins 1238 and 1239 on the connector plates 1231 and 1232 and the pins 1234 and 1235 on the reciprocable rotary disc 1233. Owing to the arrangement of elongated holes 1243 and 1244 on the connector plates 1231 and 1232 it is assured that an any shock can be effectively absorbed which may occur when the reciprocable rotary disc 1233 is caused to stop at the offset position and that contact pressure between the driving rollers 1216 and the follower rollers 1221 and 1222 is kept constant under the influence of resilient force imparted by means of the tension springs 1241 and 1242 and another springs (not shown) which are effective in thrusting the axles of the follower rollers 1221 and 1222 toward the printing paper guide passage 1212.

Next, the higher speed transporting section 1250 and the lower speed transporting section 1260 are principally constructed by a combination of driving rollers and driven rollers both of which are rotatably supported on both the side walls of the dark box 12 by means of shafts (not shown) extending therethrough, said side walls being designed in the same configuration and connected to one another with the aid of stays extending therebetween. Each of the rollers in the lower speed transporting section 1260 is equipped with an one-way clutch which allows them to be rotated only in the direction of forwarding the printing paper P' so that a sheet of preceding paper P' is spaced from another sheet of following paper P' by a possibly short distance, said sheet of paper P' being processed by way of the steps of cutting a strip of printing paper to a predetermined length in the dark box 13, delivering the cut printing paper to the exposing section 1201 in the dark box 12, allowing it to be subjected to exposing and printing therein and then transporting it to the lower speed transporting section 1260 via the higher speed transporting section 1250. Reference numeral 1261 designates an outlet through the exposed printing paper is forwarded to a processor (not shown).

Next, description will be made as to the dark box 13 for containing a roll of printing paper therein with reference to FIG. 3.

At least one of the side walls constituting the dark box 13 is disconnectable therefrom and a shaft 1301 for holding a roll of printing paper P thereon, free rotating rollers 1302 and 1304, a tension roller 1303, a pair of delivery rollers 1305 one of which is a driving roller, and a cutter 1306 are disposed in the dark box 13. Each of these members is designed in such a manner that it is caused to start or stop its operation in association with start or stop of operation of the above-mentioned members so as to deliver a sheet of printing paper P' to the exposing section 1201 in the dark box 12. In the illustrated embodiment the cutter 1306 is located in the dark box 13 but the present invention should be not limited only to this. Alternatively, it may be disposed in the vicinity of the exposing section 1201 in the dark box 12. To prevent any material loss of printing paper only a requirement is that a strip of printing paper P is delivered by a predetermined length, it is cut to the length by means of the cutter 1306, and the predetermined length of printing paper P' is then forwarded to the exposing section 1201 in which exposing and printing are carried out for the printing paper.

Alternatively, a modification may be made such that the cutter 1306 is disposed at the position in the vicinity of the outlet leading to a processor while it is located in the dark box 13, wherein the higher speed transportion section is eliminated and thereby transportation is carried out by way of the lower speed transporting section 1260. As a modification from the preceding embodiment the cutter 1306 may be disposed between the exposing section 1201 and the higher speed transporting section 1250 so that a strip of printing paper P is intermittently delivered by a length corresponding to that of a single photograph without any cutting operation carried out while it moves through the exposing area on the vertical printing paper guide plate 1202 in the exposing section 1201 and it is then subjected to cutting with the aid of the cutter 1306. Further, as another modification the fan 1205 serving to draw the printing paper toward the fore surface of the vertical guide plate 1202 may be continuously operated without any intermittence.

Next, operation of the printer in accordance with the first embodiment of the invention will be described below.

Prior to starting operation the mirror 1106 is held in contact against the partition 1102 and thereby the light beam guide opening 1103 formed on the latter is closed, as illustrated by real lines in FIG. 3. On the other hand, the cover 403 for the window 4 is kept open, as illustrated also by real line in the drawing. Further, the mirror 305 located below the window 3 is kept open, as illustrated by real lines in the same drawing. The negative film mask 15 with a negative film held thereon is inserted into the space between both the upper and lower holding discs 105 and 203 and the light beam source 101 is turned on. Now, a viewer is ready to observe optical density of the negative film through the window 3. Further, he is ready to carry out trimming operation with the negative film while he observe its image projected on the screen 1105 through the window 4.

Next, the mirror 305 is caused to turn in the anticlockwise direction by actuating the rotary solenoid 303 until the mirror 305 shuts the open end face of the inclined sleeve 302, as illustrated by two-dot chain lines in the drawing. As the motor 1121 starts its rotation (see FIG. 7), the mirror 1106 is caused to turn in the anticlockwise direction until it assumes the position in the passage of light beam as illustrated by two-dot chain lines in the drawing. Before the minor 1106 is caused to turn, the cover 403 is closed, as illustrated by chain lines in the drawing.

Prior to carrying out exposing and printing, a roll of printing paper P mounted on the shaft 1301 in the dark box 13 and the leading end of the printing paper is guided to the pair of delivery rollers 1305 via the free rotating roller 1302, the tension roller 1303 and the free rotating roller 1304. On the other hand, the folding door-shaped guide plates 1206 and 1207 are located at the position located opposite to the vertical printing paper guide plate 1202 with the printing paper guide passage 1212 formed therebetween, while the driving rollers 1218 are brought in rolling contact with the corresponding follower rollers 1221 and 1222, as illustrated in FIG. 12.

Figure 10:
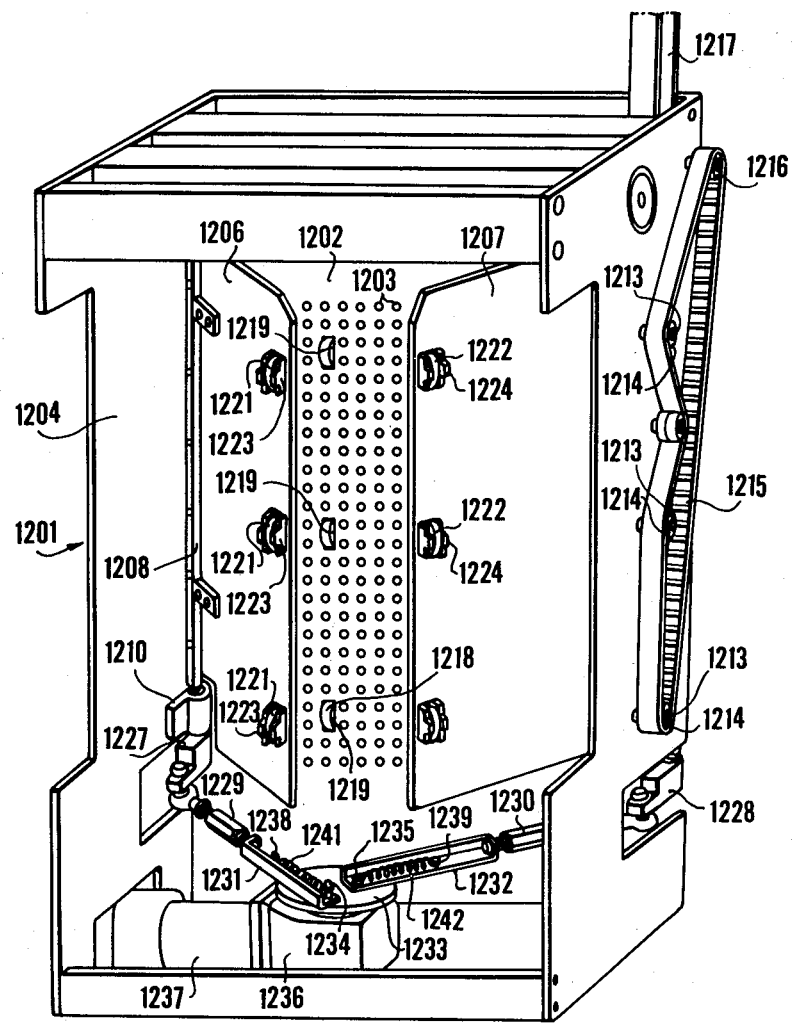

By rotating the driving roller in the pair of delivery rollers 1305 as well as the driving rollers 1218 on the vertical guide plate 1202 a strip of printing paper P is forwarded by a distance corresponding to the length of a single photograph. When it comes to a stop, the cutter 1306 is actuated and thereby a sheet of printing paper P' is prepared. At this moment the leading end of the printing paper P' has already entered the exposing section 1201 but it does not yet assume the predetermined exposing position. Thus, it is forwarded to the correct exposing position by rotating only the driving rollers 1218 again. After the driving rollers 1218 are stopped, the fans 1205 start their operation so that the printing paper P' is drawn toward the vertical guide plate 1202 under reduced pressure generated by the fans 1205 until it is firmly held on the vertical guide plate 1202. Next, the reversible motor 1237 is driven and thereby the reciprocable rotary disc 1233 is rotated by way of the speed reduction gear box 1236 in the clockwise direction as seen in FIG. 12 until the folding door-shaped guide plates 1206 and 1207 are fully opened as illustrated in FIG. 11 by way of the half opened state as illustrated in FIG. 10 by rotating the support shafts 1208 and 1209 via the pins 1234 and 1235, the connector plates 1231 and 1232, the turnbuckles 1229 and 1230 and the turnable arms 1227 and 1228. Thus, the printing paper P' having a length corresponding to that of a single photograph is ready to be subjected to exposure while it is firmly held against the correct exposing area on the vertical guide plate 1202 with the aid of the fans 1205 which serve to generate reduced pressure.

Figure 12:
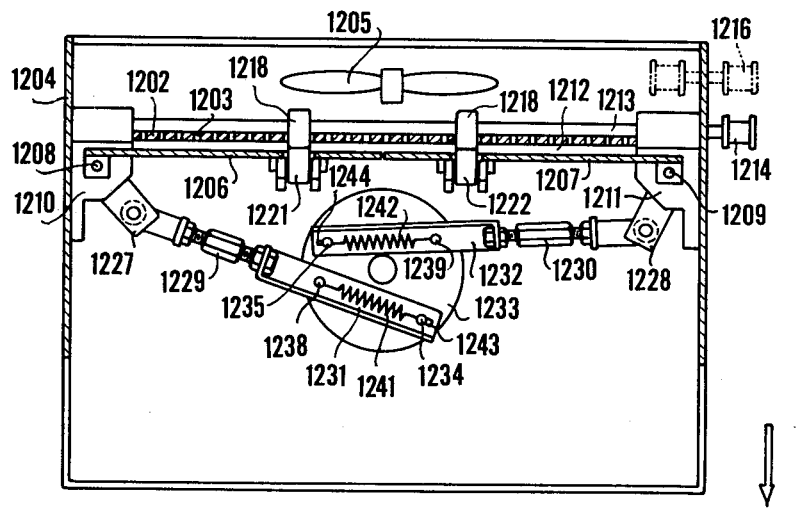

On completion of exposing and printing operation for the printing paper P' the reversible motor 1237 is caused to rotate in the opposite direction and thereby the reciprocable rotary disc 1233 is rotated in the anticlockwise direction as seen in FIG. 11 whereby the folding door-shaped guide plates 1206 and 1207 are closed together and restore the original position as illustrated in FIG. 12.

At this moment the fans 1205 comes to stop their operation and the driving rollers 1218 are then rotated so as to deliver the exposed printing paper P' to the higher speed transporting section 1250 in cooperation with the follower rollers 1221 and 1222. Finally it is forwarded to a processor (not shown) by way of the lower speed transporting section 1260.

The above-described steps of operations are repeated for another sheet of printing paper to be printed next.

Next, a printer in accordance with the second embodiment of the present invention will be described particularly with reference to FIGS. 13 to 18. As will be apparent from FIG. 18, this embodiment consists in that the exposing section 1201 in the printer in accordance with the first embodiment (typically illustrated in FIG. 3) is replaced with a modified exposing section 2201. Thus, parts, members and sections other than the exposing section are substantially same to those in the first embodiment.

Now, description will be made in more details as to the exposing section 2201 with reference to FIGS. 13 to 17.

Figure 13:
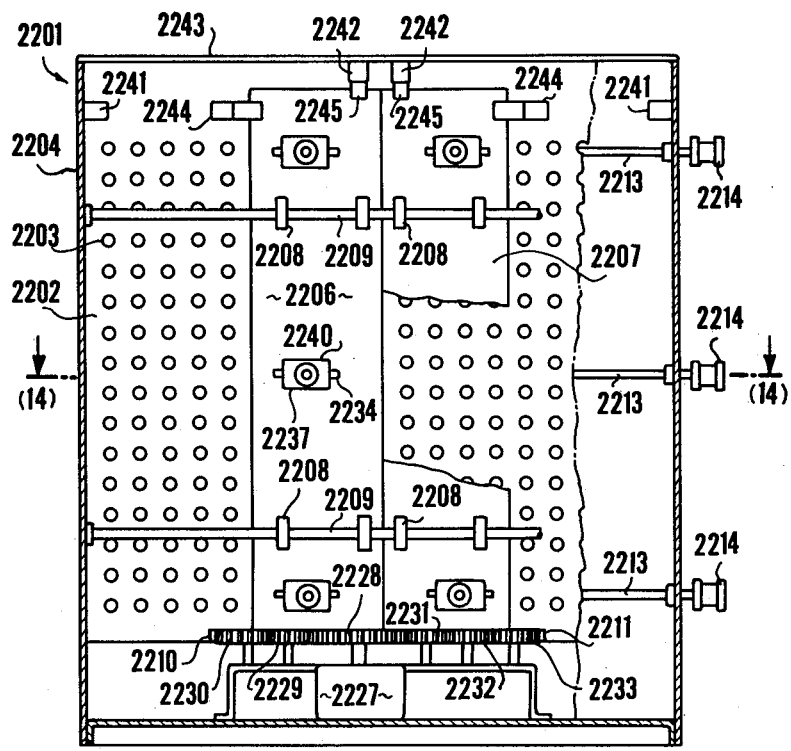
Figure 14:
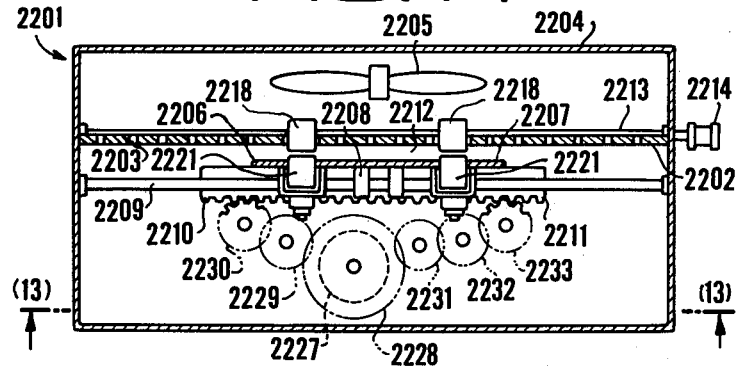

In the drawings in which FIG. 13 is a front view of the exposing section 2201, shown in the partially sectioned state and FIG. 14 is a cross-sectional view of the same taken in line 14—14 in FIG. 3 reference numeral 2202 designates a vertical printing paper guide plate with a large number of air passage holes 2203 formed thereon and the whole vertical guide plate 2202 is firmly supported within a frame structure 2204. Reference numeral 2205 designates a suction fan disposed behind the vertical guide plate 2202 for drawing a sheet of printing paper in the rearward direction under reduced pressure. Reference numerals 2206 and 2207 designate a slidable guide plate located forward of the vertical guide plate 2202 and in the proximity of the same. Reference numeral 2208 designates a sliding piece which is located at the upper and lower parts of the slidable guide plates 2206 and 2207 in the form of a pair. The sliding pieces 2208 are slidably fitted onto upper and lower guide rods 2209 which extend in the horizontal direction between both the side walls of the frame structure 2204. Thus, the slidable guide plates 2206 and 2207 are slidably supported on the guide rods 2209 by way of the sliding pieces 2208 fixedly secured to the slidable guide plates. Reference numerals 2210 and 2211 designate a rack attached to the fore surface of the slidable guide plates 2206 and 2207 at the lower part thereof in such a manner that its teeth is directed forward. Reference numeral 2228 designates a driving gear adapted to be rotated by means of a reversible electric motor 2227. The rack 2210 is in operative association with the driving gear 2228 by way of intermediate gears 2229 and 2230 and the rack 2211 is in operative association with the same by way of another intermediate gears 2231, 2232 and 2233 whereby the slidable guide plates 2206 and 2207 are opened or closed by displacing them outward or inward relative to the vertical center line of the vertical guide plate 2202. As will be readily understood from the above description, a combination of the sliding pieces 2208 and the horizontally extending guide rods 2209 constitutes a guiding means for guiding the slidable guide plates, whereas a combination of the racks 2210 and 2211, the reversible motor 2227, the driving gear 2228 and the intermediate gears 2229 to 2233 constitutes an actuating means for opening or closing the slidable guide plates. Reference numeral 2212 designates a printing paper guide passage formed between the vertical guide plate 2202 and the slidable guide plates 2206 and 2207 through which a sheet of printing paper is adapted to move downward. Reference numeral 2213 designates a plurality of rotatable shafts disposed one after another on the rear surface of the vertical guide plate 2202, each of said shafts 2213 extending in the horizontal direction between both the side walls of the frame structure 2204 in parallel to one another to be rotatably supported by means of bearings fitted into the side walls. As is best seen from FIG. 14, each of the shafts 2213 includes a pulley 2214 fixedly mounted on the outermost end part thereof located outward of the one side wall of the frame structure 2204. An endless timing belt (not shown) extends round each of the pulleys 2214 so that the shafts 2213 are in operative association with one another. As is apparent from FIG. 18, the shafts 2213 are synchronously driven by means of a stepping motor 2280 via a transmission mechanism 2281.

Figure 15:
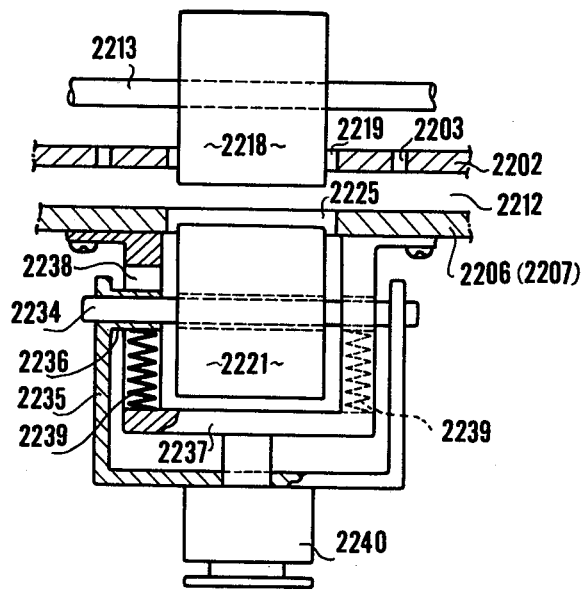
Figure 16:
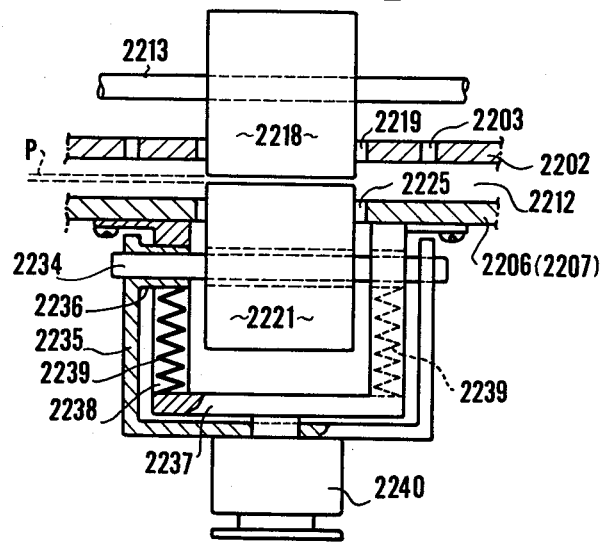

Reference numeral 2218 designates a driving roller which is disposed on both the left and right parts of each of the shafts 2213 at the position located symmetrically relative to the vertical center line of the guide plate 2202. As illustrated in FIGS. 15 and 16 a part of the driving rollers 2218 is projected into the printing paper guide passage 2212 through openings 2219 formed on the vertical guide plate 2202 until it comes in contact with the rear surface of the printing paper which moves downward through the guide passage 2212.

Figure 17:
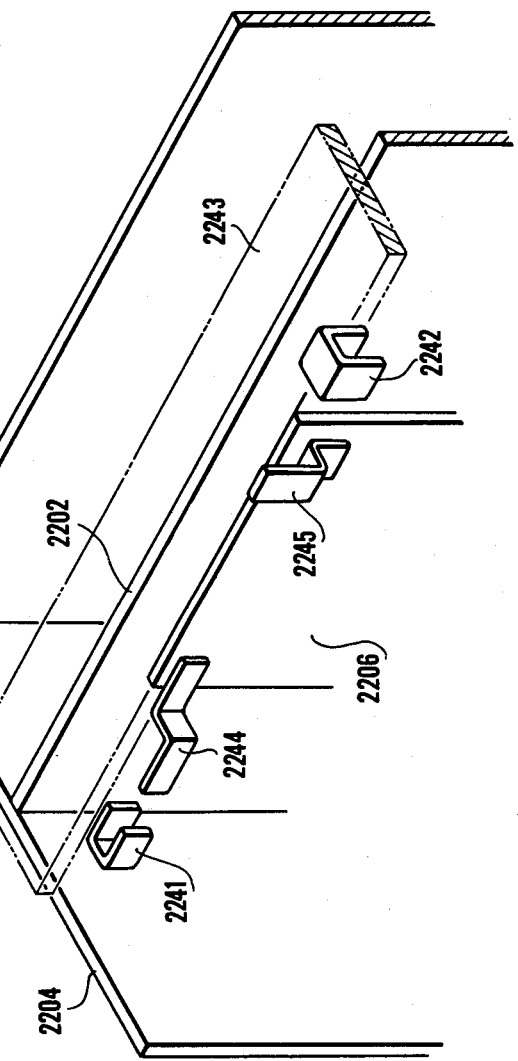

Reference numeral 2221 designates a follower roller disposed at the position corresponding to that of the driving roller 2218. A part of the follower rollers 2221 are also projected into the printing paper guide passage 2212 through openings 2225 formed on the slidable guide plates 2206 and 2207 in such a manner they are thrusted into or retracted from the guide passage 2212 (see FIGS. 15 and 16). As is apparent from FIGS. 15 and 16, both the end parts of a shaft 2234 on which the follower roller 2221 is fixedly mounted are rotatably supported by means of bearings 2236 fitted into both the side members of an U-shaped movable frame 2235. Reference numeral 2237 designates an U-shaped stationary frame located within the U-shaped movable frame 2235, said stationary frame 2237 being fixedly secured to the slidable guide plates 2206 and 2207. The stationary frame 2237 is formed with slots 2238 on both the side members thereof along which the bearings 2236 on the shaft 2234 of the follower roller 2221 are slidably displaced. Reference numeral 2239 designates an expansive spring which is contained in the slot 2238 so as to thrust the bearings 2236 toward the guide passage 2212. Thus, the follower roller 2221 is brought in contact with the driving roller 2218 under constant pressure imparted by means of the expansive springs 2239 whereby the driving roller 2218 cooperates with the follower roller 2221 to forward a sheet of printing paper through the guide passage 2212. Reference numeral 2240 designates a solenoid which is fixedly secured to the free end part of the center shaft of the movable frame 2235. As the solenoid 2240 is magnetized and push the stationary frame 2237, the movable frame 2235 is displaced away from the stationary frame 2237 against resilient force of the spring 2239 so that the follower roller 2221 comes out of contact with the driving roller 2218. Reference numeral 2241 designates a sensor by means of which full opening of the slidable guide plates 2206 and 2207 is detected and thereby the reversible motor 2227 is caused to stop its rotation, whereas reference numeral 2242 designates another sensor by means of which full closing of the slidable guide plates 2206 and 2207 is detected and thereby the reversible motor 2227 is caused to stop its rotation in the opposite direction. As illustrated in FIGS. 13 and 17, the sensors 2241 are attached to the inner surface of the each side walls of the frame structure 2204 at the upper end part thereof, whereas the sensors 2242 are attached to the bottom surface of a support plate 2243 at its central part, said support plate 2243 being bridged between the upper ends of the side walls of the frame structure 2204. To actuate the sensors 2241 and 2242 detecting members 2244 and 2245 are attached to the fore surface of the slidable guide plates 2206 and 2207 at the upper part thereof. The above-described mechanism for opening or closing the slidable guide plates 2206 and 2207 are designed to operate in association with stop and start of rotation of the driving rollers 2218.

The solenoid 2240 is magnetized before the slidable guide plates 2206 and 2207 are opened away from one another and it is demagnetized after they are closed together.

In the illustrated embodiment two slidable guide plates 2206 and 2207 are provided in juxtaposition to the vertical guide plate 2202, but the present invention should be not limited only to this. Alternatively, a single slidable guide plate may be replaced with the slidable guide plates 2206 and 2207. The guide plates 2206 and 2207 may be guided by guide rail. Further, a combination of racks and gears in the guide plate actuating mechanism may be replaced with a combination of cranks and cams.

It should be noted that the reversible motor 2227, the solenoids 2240 and the stepping motor 2280 are controlled by means of a computor incorporated in the control box 14 (see FIG. 1).

Next, operation of the printer in accordance with the second embodiment will be described below.

Figure 18:
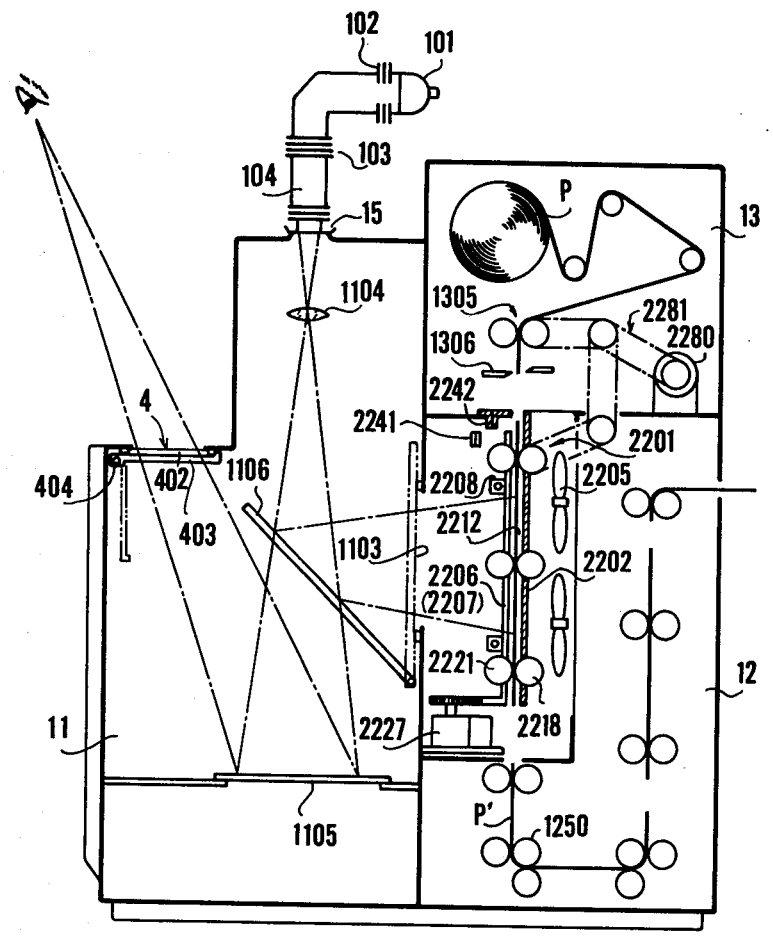

Prior to starting operation of the printer the mirror 1106 is kept in contact with the partition between both the dark boxes 11 and 12 to shut the light beam guide opening 1103, as illustrated by two-dot chain lines in FIG. 18. The trimming window 4 is opened with the cover 403 being turned downward, as illustrated by chain lines in the drawing. After completion of trimming operation the mirror 1106 is caused to turn in the anticlockwise until it assumes the position in the light beam passage as illustrated by real lines, whereas the cover 403 is closed also as illustrated by real lines in the same manner as in the first embodiment. Prior to the above operation, a roll of printing paper P has been fitted onto a support shaft in the dark box 13 with one of the side walls disconnected therefrom. At this moment the solenoids 2240 are demagnetized and the follower rollers 2221 are brought in pressure contact with the driving rollers 2218 under the influence of resilient force imparted by the expansive springs 2239, as illustrated in FIG. 16. The slidable guide plates 2206 and 2207 are closed together as illustrated in FIGS. 13 and 14. Next, the fans 2205 and the stepping motor 2280 start their operation by depressing a start button (not shown). As the fans 2205 are operated, air in the dark boxes is circulated by way of the chamber located in front of the vertical guide plate 2202, the holes 2203, the chamber located behind the vertical guide plate 2202 and air passages (not shown) disposed outside the frame structure 2204. The pair of delivery rollers 1305, the driving rollers 2218, the follower rollers 2221 and a number of rollers in the transporting section 1250 are rotated by means of the stepping motor 2280. A roll of printing paper P contained in the dark box 13 is unreeled by means of the pair of delivery rollers 1305 and it is then forwarded into the printing paper guide passage 2212 in the exposing section 2201 while the driving rollers 2218 cooperate with the follower rollers 2221. During downward movement of the printing paper P it is urged toward the vertical guide plate 2202 under the influence of air suction effected by the fans 2205 and thereby it becomes flattened along the fore surface of the vartical guide plate 2202. When the printing paper P is forwarded into the gide passage 2212 by a predetermined length, the delivery rollers 1305 and the driving rollers 2218 are stopped and the cutter 1306 is then initiated to operate whereby a sheet of printing paper P' is cut off from a strip of printing paper P. Then, the printing paper P' is forwarded to the exposing position and the driving rollers 2221 are then caused to stop again. At this moment the solenoids 2240 are magnetized and thereby the follower rollers 2221 are displaced away from the driving rollers 2218 against resilient force of the expansive spring 2239, as illustrated in FIG. 15. As the reversible motor 2227 is rotated in the anticlockwise direction in FIG. 14 after displacement of the follower rollers 2221 away from the driving rollers 2218, the slidable guide plate 2206 is caused to slide leftward by actuating the power transmission system comprising the driving gear 2228, the intermediate gears 2229 and 2230 and the rack 2210, whereas the slidable guide plate 2207 is caused to slide rightward by actuating the power transmission system comprising the driving gear 2228, the intermediate gears 2231, 2232 and 2233 and the rack 2221. When both the slidable guide plates 2206 and 2207 reach the outermost position of their slide movement where they are fully opened away from one another, the sensors 2241 detect the detecting members 2244 attached to the upper part of the slidable guide plate 2206 and 2207 and issue signals to the control panel 5 (see FIG. 1) therefrom whereby a switch (not shown) for the reversible motor 2227 is turned off and the slidable guide plates 2206 and 2207 come to a stop while they are opened away from one another. At this moment a sheet of printing paper P' is displaced in contact with the fore surface of the vertical guide plate 2202 under suction force due to reduced pressure generated by the fans 2205. Now, exposing and printing is ready to be carried out.

On completion of exposing and printing the reversible motor 2227 is caused to rotate clockwise and thereby the slidable guide plates 2206 and 2207 are closed together by actuating the power transmission systems comprising the driving gear 2228, the intermediate gears 2229 to 2233 and the racks 2210 and 2211. When the slidable guide plates reach the innermost position of their slide movement where they are closed together, the sensors 2242 detect the detecting members 2245 attached to the bottom of the support plate 2243 and issue their signals to the control panel 5 whereby the switch for the reversible motor 2227 is turned off again and thereby the slidable guide plates 2206 and 2207 come to a stop while they are closed together in the position as illustrated in FIG. 14. At the same time the solenoids 2240 become demagnetized and the follower rollers 2221 are brought in contact with the driving rollers 2218 by means of the expansive springs 2239 as illustrated in FIG. 16. Since the solenoids 2240 are magnetized and thereby the follower rollers 2221 contained in the openings 2225 are displaced outward of the guide passages 2212 prior to starting opening or closing movement of the slidable guide plates 2206 and 2207, there is no fear of causing frictional contact between the follower rollers 2221 and the printing paper P'.

Then, the stepping motor 2280 is caused to rotate again and the exposed printing paper P' is transferred from the exposing section 2201 to a processor (not shown) by way of transporting section 1250. After a predetermined period of time elapses, the stepping motor 2280 is stopped and a start button (not shown) is turned off whereby the initial position prior to starting operation is restored. Now, next operation is ready to be carried out.

Finally, a printer in accordance with the third embodiment of the present invention will be described in more detail with reference to FIGS. 19 to 28. As will be apparent from FIG. 27 this embodiment consists in that the exposing section 1201 in the first embodiment (see FIG. 3) is replaced with a modified exposing section 3201. Parts, members and sections other than said modified exposing section 3201 are substantially same to those in the first embodiment.

The exposing section 3201 will be described below particularly with reference to FIGS. 19 and 26.

Figure 19:
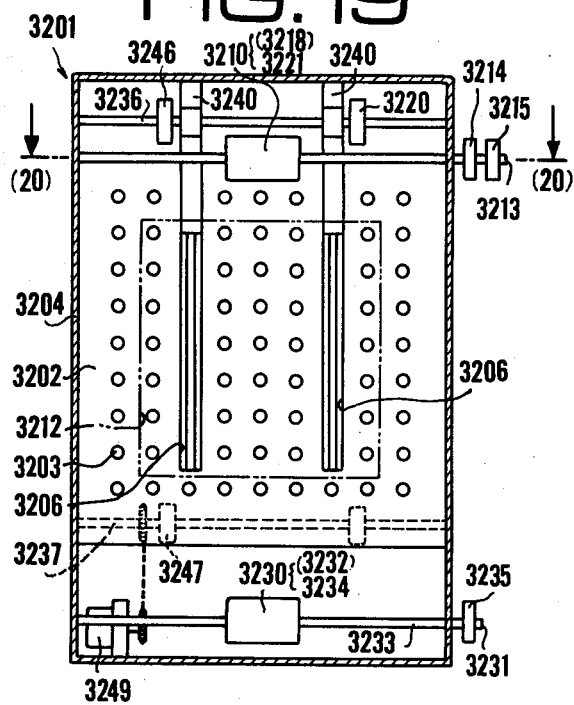
Figure 20:
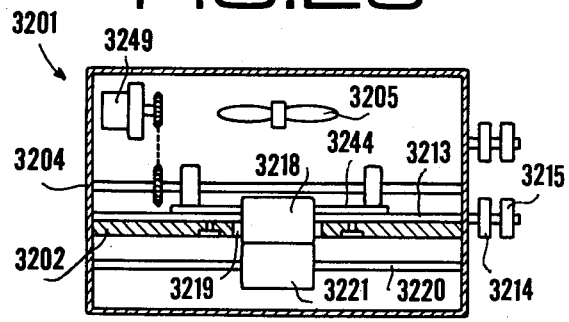
Figure 23:
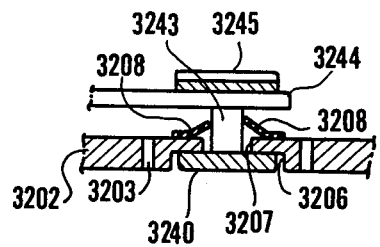

In the drawings in which FIG. 19 is a front view of the exposing section 3201 and FIG. 20 is a cross-sectional view of the same taken in line 20—20 in FIG. 19 reference numeral 3202 designates a vertical printing paper guide plate which is firmly supported in the vertical posture in a frame structure 3204. A large number of air passage holes 3203 are formed over an exposing area 3212 and the peripheral area surrounding said exposing area 3212 on the vertical guide plate 3202, and further two vertically extending grooves 3206 are formed at the position located symmetrically relative to the vertical center line of the vertical guide plate 3202. As is best seen in FIG. 23, the guide grooves 3206 have a T-shaped cross-sectional configuration and an opening 3207 formed behind the vertical guide plate 3202 is covered with an elastic plate 3208 made of elastomeric material such as rubber or the like so as to prevent an occurance of air flow therethrough.

Reference numeral 3210 designates a pair of delivery rollers disposed at the upper part of the vertical guide plate 3202, whereas reference numeral 3230 does a pair of discharge rollers disposed at the lower part of the same. The pair of delivery rollers 3210 comprise a driving roller 3218 fixedly mounted on a rotatable shaft 3213 and a follower roller 3221 fixedly mounted on another rotatable shaft 3220, said driving roller 3218 being adapted to cooperate with said follower roller 3221. As is best seen from FIG. 20, a part of the driving roller 3218 is projected forward of the vertical guide plate 3202 through an opening 3219 formed thereon. Both the rotatable shafts 3213 and 3220 are rotatably supported between both the side walls of the frame structure 3204. Reference numerals 3214 and 3215 designate a pair of pulleys fixedly mounted on the projected part of the rotatable shaft 3213 located outward of the frame structure 3204 at the right side thereof as seen in the drawings. The pair of delivery rollers 3210 forward the printing paper P′ to the exposing area 3212 along the fore surface of the vertical guide plate 3202 while the driving roller 3218 cooperates with the follower roller 3221 to hold the central part of the printing paper P′ therebetween.

Figure 27:
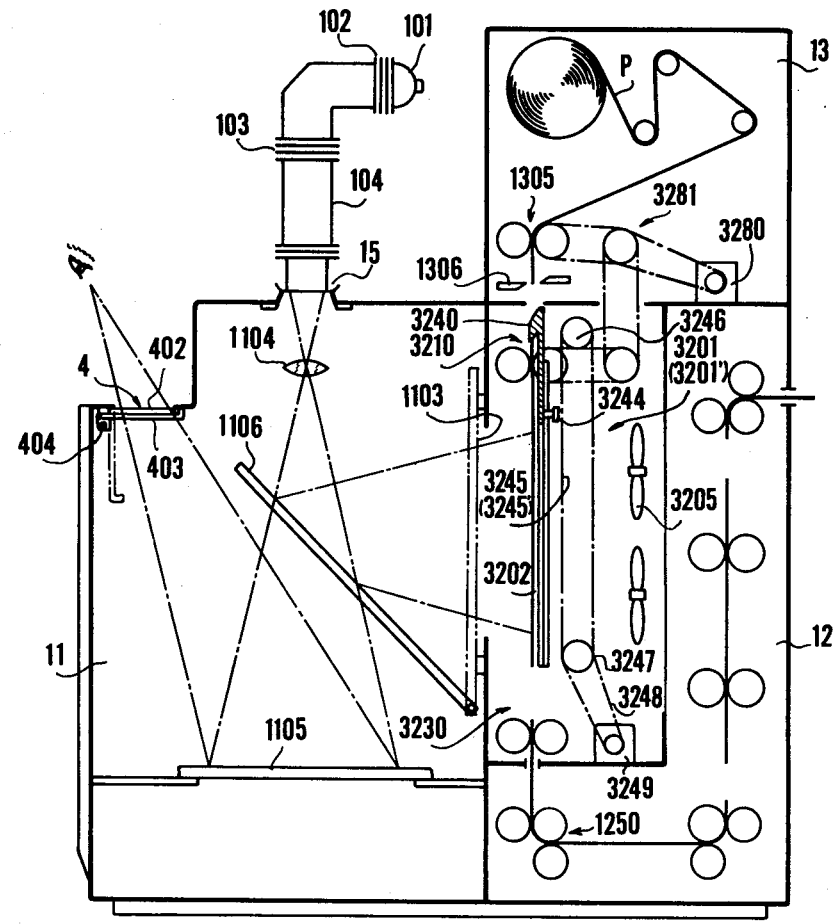

The pair of discharge rollers 3230 comprises a driving roller 3232 fixedly mounted on a rotatable shaft 3231 and a follower roller 3234 fixedly mounted on another rotatable shaft 3233, said driving roller 3232 being adapted to cooperate with said follower roller 3234. Both the rotatable shafts 3231 and 3233 are rotatably supported between both the side walls of the frame structure 3204. Reference numeral 3235 designates a pulley fixedly mounted on the projected part of the rotatable shaft 3231 located outward of the frame structure 3204 also at the right side thereof as seen in the drawings. The pair of discharge rollers 3230 forward the exposed printing paper P′ out of the exposing area 3212 while the driving roller 3232 cooperates with the follower roller 3234 to hold the central part of the printing paper P′ therebetween. The rotatable shaft 3213 for the delivery rollers 3210 and the rotatable shaft 3231 for the discharge rollers 3230 are driven by way of a stepping motor 3280 and a power transmission mechanism 3281 comprising an endless timing belt, pulleys and clutches as illustrated in FIG. 27.

Figure 21:
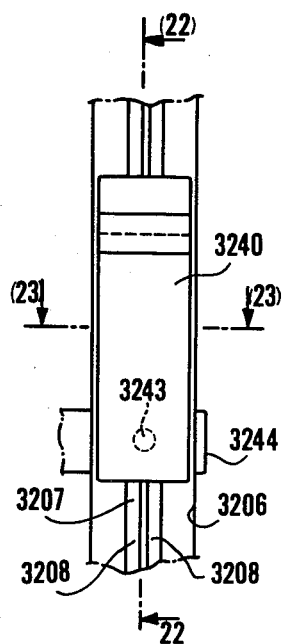
Figure 22:
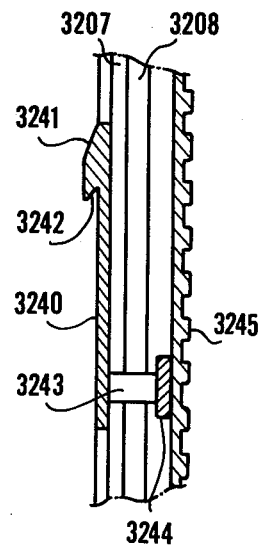

Reference numeral 3240 designates a printing paper thrusting member which is fitted into the guide groove 3206 on the vertical guide plate 3202 in such a manner as to slide along the guide groove 3206 in the vertical direction (see FIG. 21). As is best seen from FIG. 23, the fore surface of the printing paper thrusting member 3240 is flush with the fore surface of the vertical guide plate 3202. As illustrated in FIG. 22, the thrusting member 3240 includes a wedge-shaped inclined portion 3241 and a stepped engagement portion 3242 both of which are formed at the upper part thereof. Reference numeral 3243 designates a thrusting member support pin projecting from the rear surface of the thrusting member 3240. As is apparent from FIG. 23, the thrusting member support pin 3243 projects rearward through the opening 3207 and the elastic plate 3208. The foremost ends of the support pins 3243 are fixed to a transverse plate 3244 which is in turn attached to endless timing belts 3245. As illustrated in FIG. 27, the timing belts 3245 are spanned between an upper pulley 3246 and a lower pulley 3247 so that the printing paper thrusting members 3240 are in operative connection with a stepping motor 3249 by way of an endless timing belt 3248. Both the upper and lower pulleys 3246 and 3247 are fixedly mounted on rotatable shafts 3236 and 3237 which are rotatably supported on the frame structure 3204 (see FIG. 19). By operating the stepping motor 3249 in the normal direction or in the reverse direction the printing paper thrusting members 3240 are displaced upward or downward while they slide along the guide grooves 3206.

Figure 24:
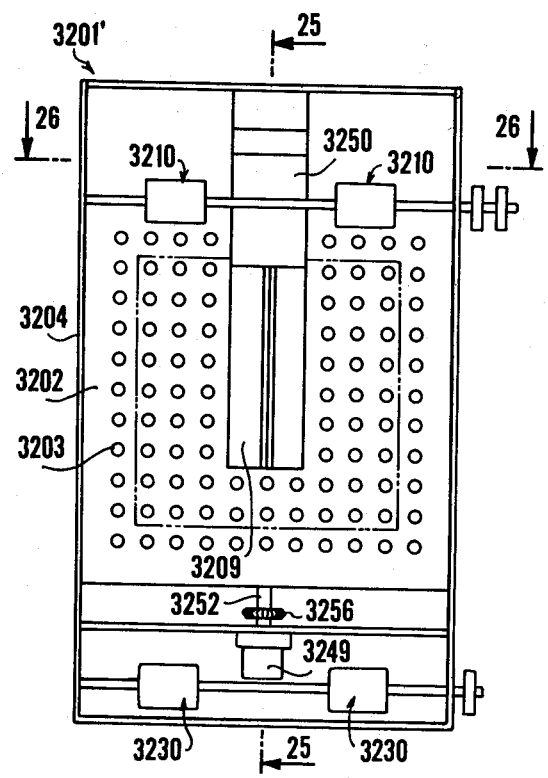
Figure 25:
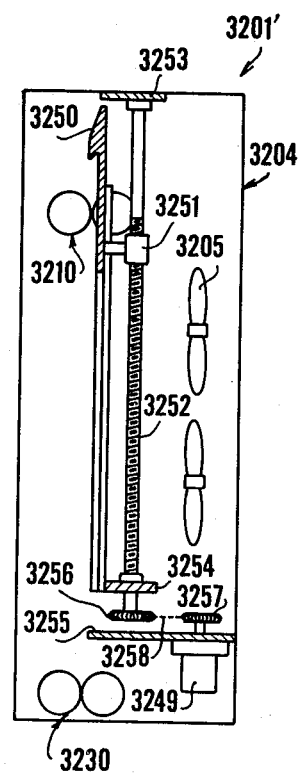
Figure 26:
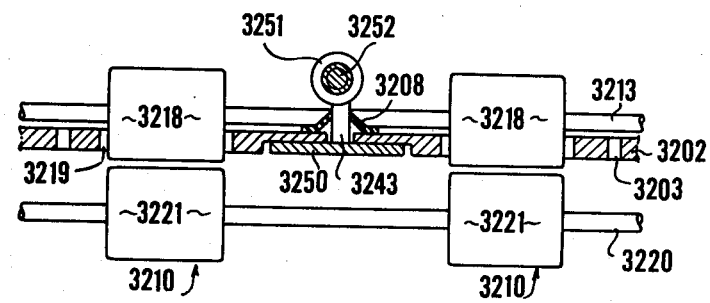

Next, FIGS. 24 to 26 illustrate a modification from the third embodiment as described above. This modified embodiment consists in that the delivery rollers 3210 and the discharge rollers 3230 are disposed symmetrically relative to the vertical center line of the guide plate 3202 at its upper and lower parts and a single printing paper thrusting member 3250 having a width more than that in the preceding embodiment is provided at the central part of the vertical guide plate 3202 in such a manner as to vertically slide along single guide groove 3209 having a width more than that in the preceding embodiment. Reference numeral 3251 designates a female threaded nut fixedly secured to the rear surface of the thrusting member 3250 by way of a thrusting member support pin 3243. A vertically extending male threaded rod 3252 is screwed through the female threaded nut 3251. The upper and lower end parts of the male threaded rod 3252 are rotatably supported by means of an upper support plate 3253 and an intermediate support plate 3254 both of which extend between both the side walls of the frame structure 3204. Reference numeral 3256 designates a pulley fixedly secured onto the lowermost end part of the male threaded rod 3252 projected downward of the intermediate plate 3254, reference numeral 3257 does a pulley fixedly secured onto the uppermost end part of a shaft of a stepping motor 3249 projected upward of the lower support plate 3255 which extends between both the side walls of the frame structure 3204 and reference numeral 3258 does an endless timing belt spanned between said pulleys 3256 and 3257. By operating the stepping motor 3249 in the normal direction or in the reverse direction the printing paper thrusting member 3250 is vertically displaced in such a manner as to slide along the guide groove 3209 upward or downward. In the illustrated embodiment the thrusting member 3250 is vertically displaced by a combination of the female threaded nut 3251, the male threaded rod 3252 and the timing belt 3258. Alternatively, it may be vertically displaced by a combination of the transverse plate 3244 and the timing belt 3245.

Reference numeral 3205 designates a fan for drawing the printing paper toward the vertical guide plate 3202. Each of the fans 3205 is located behind the vertical guide plate 3202, as illustrated in FIGS. 20, 25 and 27. By operating the fans 3205 the printing paper P′ introduced into the exposing section is always thrusted against the fore surface of the vertical guide plate 3202. Suction force generated by the fans 3205 is determined so as to allow the printing paper P′ to be flattened over the exposing area 3212 where the delivery rollers 3210 and the discharge rollers 3230 are not disposed.

Next, operation of the printer in accordance with the third embodiment will be described below.

Prior to starting operation the mirror 1106 is held in tight contact against the partition between the dark boxes 11 and 12 to shut the light beam guide opening 1103, as illustrated by two-dot chain lines in FIG. 27. The trimming window 4 is kept open with the cover 403 being turned downward, as illustrated also by chain lines in the drawing. After completion of trimming operation the cover 403 is closed as illustrated by real lines in the drawings and the mirror 1106 is caused to turn anticlockwise to assume the position in the light beams passage as illustrated by real lines. Prior to operations a roll of printing paper P has been fitted on the support shaft in the dark box 13 with one of the side walls thereof disconnected therefrom in the same manner as in the first embodiment. At this moment the printing paper thrusting member 3240 or 3250 is raised up at the uppermost position. Since the thrusting member 3240 and the thrusting member 3250 are substantially same to one another in structure and function, description will be made only as to the thrusting member 3240 for the purpose of simplification.

Figure 28:
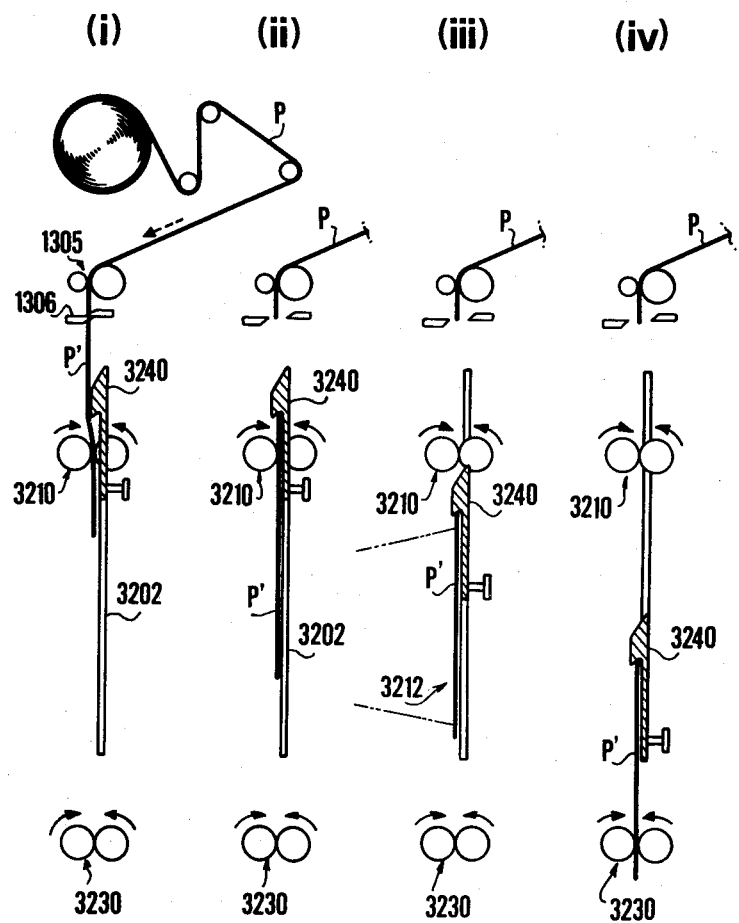

When a start button (not shown) is depressed, the fans 3205 are rotated, air in the dark boxes is circulated by way of the chamber located forward of the vertical guide plate 3202, the holes 3203 on the exposing area 3212 of the vertical guide plate 3202, the chamber located behind the vertical guide plate 3202 and air passages (not shown) disposed outside the frame structure 3204. The pair of delivery rollers 1305, the pair of delivery rollers 3210, the pair of discharge rollers 3230 and the transporting section 1250 are operated by means of the stepping motor 3280. As illustrated in FIG. 28(*i*), a roll of printing paper P in the dark box 13 is unreeled by means of the pair of delivery rollers 1305 and it is then introduced in the exposing area on the vertical guide plate 3202 after climbing over the inclined portion 3241 of the printing paper thrusting member 3240. When the printing paper P is forwarded by a predetermined distance, the pair of delivery rollers 1305 stop their operation and at the same time the cutter 1306 is actuated to cut it to a sheet of printing paper P' having a length equal to that of a single photograph. The cut printing paper P' is then forwarded further. On completion of introduction of the printing paper into the exposing section with the aid of the pair of delivery rollers 3210 the printing paper P' is urged toward the fore surface of the vertical guide plate 3202 whereby it is firmly held thereon under reduced pressure generated by the fans 3205, as illustrated in FIG. 28(*ii*). Next, the stepping motor 3249 starts its operation and thereby the printing paper thrusting member 3240 is displaced downward together with the printing paper P' while the latter is attracted toward the vertical guide plate 3202, until it reaches the predetermined position in the exposing area 3212 as illustrated in FIG. 28(*iii*). When the printing paper P' reaches the exposing area 3212, the stepping motor 3249 is stopped temporarily. Exposing and printing are carried out while the printing paper is stationarily held in the exposing area 3212. After completion of exposing and printing the stepping motor 3249 starts its operation again and thereby the thrusting member 3240 is displaced downward again together with the printing paper P' whereby the latter is caught by the pair of discharge rollers 3230, as illustrated in FIG. 28(*iv*). It is then transferred to a processor (not shown) by way of the transporting section 1250, as illustrated in FIG. 27. After the printing paper P' is caught by the discharge rollers 3230, the stepping motor 3249 is caused to rotate in the reverse direction so that the printing paper thrusting member 3240 is displaced upward. When the thrusting member 3240 reaches the uppermost position, the start button is turned off and the initial position prior to starting operation is restored. Now, next operation is ready to be carried out repeatedly.

As many apparently widely different embodiments of this invention may be made without departing from the spirit and scope thereof, it is to be understood that the invention is not limited to the specific embodiments thereof except as defined in the appended claims.

What is claimed is:

1. In a printer including a trimming dark box disposed below a light beam source, an exposing and printing dark box located behind said trimming dark box, a printing paper containing dark box located behind the trimming dark box and above said exposing and printing dark box, said printing paper containing dark box having a roll of printing paper carried on a support shaft, and a control box with at least an electric circuit incorporated therein for controlling a variety of operations of the printer, the improvement consisting in;

the trimming dark box includes a negative film mask attachment section, a trimming window, both of said negative film mask attachment section and said trimming window being disposed on an upper board constituting a part of the trimming dark box, an exposing and printing lens located below the negative film mask attachment section in alignment with the optical axis of light beam coming down therethrough, a screen horizontally held at the position located in the proximity of the bottom of the trimming dark box, said screen serving as a plane on which an image of a negative film is projected for trimming operation, and a mirror fixedly mounted on a mirror support, said mirror being located between the lens and the screen so as to change the direction of propagation of light beam toward the exposing and printing dark box and adapted to turn away from the optical axis of light beam to shut the exposing and printing dark box when trimming is to be effected, and the exposing and printing dark box includes an exposing section and a transporting section by way of which the exposed printing paper is taken out from an exposing area in said exposing section, said exposing section essentially comprising a vertical printing paper guide plate, a pair of printing paper guide plates, a printing paper guide passage formed between said vertical printing paper guide plate and said pair of guide plates, a plurality of suction fans disposed behind the vertical printing paper guide plate and a guide plate actuating mechanism, said vertical printing paper guide plate having a large number of holes formed thereon for firmly holding the printing paper against the fore surface thereof under reduced pressure generated by said suction fans and including a plurality of driving rollers rotatably mounted thereon, while said pair of printing paper guide plates being adapted to turn about vertical support shafts located at both the side edge parts of the vertical printing paper guide plate to be opened toward the trimming dark box by means of said printing paper guide plate actuating mechanism and including a plurality of follower rollers rotatably mounted thereon at the position corresponding to that of said driving rollers on the vertical printing paper guide plate to cooperate with the latter, a part of both said driving rollers and said follower rollers being projected into the printing paper guide passage through openings formed on both the vertical printing paper guide plates and the printing paper guide plates, whereby the printing paper is firmly held in contact with the vertical printing paper guide plate under reduced pressure during exposing and printing while the printing paper guide plates are kept opened and the follower rollers are displaced away from the driving rollers whereas it is introduced into or taken out from the exposing area in the printing paper guide passage while they are kept closed and the follower rollers come in contact with the driving rollers with the printing paper held therebetween during introducing or after completion of exposing and printing of the printing paper.

2. A printer as claimed in claim 1, wherein said printing paper guide plate is a pair of folding door-shaped printing paper guide plate.

3. In a printer including a trimming dark box disposed below a light beam source, an exposing and printing dark box located behind said trimming dark box, a printing paper containing dark box located behind the trimming dark box and above said exposing and printing dark box, said printing paper containing dark box having a roll of printing paper carried on a support shaft, and a control box with at least an electric circuit incorporated therein for controlling a variety of operations of the printer, the improvement consisting in;

the trimming dark box includes a negative film mask attachment section, a trimming window, both of said negative film mask attachment section and said trimming window being disposed, on an upper board constituting a part of the trimming dark box, an exposing and printing lens located below the negative film mask attachment section in alignment with the optical axis of light beam coming down therethrough, a screen horizontally held at the position located in the proximity of the bottom of the trimming dark box, said screen serving as a plane on which an image of a negative film is projected for trimming operation, and a mirror fixedly mounted on a mirror support, said mirror being located between the lens and the screen so as to change the direction propagation of light beam toward the exposing and printing dark box and adapted to turn away from the optical axis of light beam to shut the exposing and printing dark box when trimming is to be effected, and the exposing and printing dark box includes an exposing section and a transporting section by way of which the exposed printing paper is taken out from an exposing area in said exposing section, said exposing section essentially comprising a vertical printing paper guide plate, a pair of slidable printing paper guide plates, a printing paper guide passage formed between said vertical printing paper guide plate and said pair of slidable printing paper guide plates, a plurality of suction fans disposed behind the vertical printing paper guide plate and a slidable printing paper guide plate actuating mechanism, said vertical printing paper guide plate having a large number of holes formed thereon for firmly holding the printing paper against the fore surface thereof under reduced pressure generated by said suction fans and including a plurality of driving rollers rotatably mounted thereon, while said pair of slidable printing paper guide plates being adapted to slide in the transverse direction in such a manner as to move away from one another to be opened or move toward one another to be closed together by means of said slidable printing paper guide plate actuating mechanism and including a plurality of follower rollers rotatably mounted thereon at the position corresponding to that of said driving rollers on the vertical printing paper guide plate to cooperate with the latter, a part of both said driving rollers and said follower rollers being projected into the printing paper guide passage through openings formed on both the vertical printing paper guide plates and the slidable printing paper guide plates, whereby the printing paper is firmly held in contact with the vertical printing paper guide under reduced pressure during exposing and printing while the slidable printing paper guide plates are kept opened and the follower rollers are displaced away from the driving rollers whereas it is introduced into or taken out from the exposing area in the printing paper guide passage while they are kept closed and the follower rollers come in contact with the driving rollers with the printing paper held therebetween during introducing or after completion of exposing and printing of the printing paper.

4. A printer as claimed in claim 3, wherein said printing paper containing dark box includes a pair of delivery rollers for forwarding the printing paper into the exposing area in the printing paper guide passage, said pair of delivery rollers being adapted to rotate in operative association with driving rollers on the vertical printing paper guide plate.

5. In a printer including a trimming dark box disposed below a light beam source, an exposing and printing dark box located behind said trimming dark box, a printing paper containing dark box located behind the trimming dark box and above said exposing and printing dark box, said printing paper containing dark box having a roll of printing paper carried on a support shaft, and a control box with at least an electric circuit incorporated therein for controlling a variety of operations of the printer, the improvement consisting in;

the trimming dark box includes a negative film mask attachment section, a trimming window, both of said negative film mask attachment section and said trimming window being disposed on an upper board constituting a part of the trimming dark box, an exposing and printing lens located below the negative film mask attachment section in alignment with the optical axis of light beam coming down therethrough, a screen horizontally held at the position located in the proximity of the bottom of the trimming dark box, said screen serving as a plane on which an image of a negative film is projected for trimming operation, and a mirror fixedly mounted on a mirror support, said mirror being located between the lens and the screen so as to change the direction propagation of light beam toward the exposing and printing dark box and adapted to turn away from the optical axis of light beam to shut the exposing and printing dark box when trimming is to be effected, and the exposing and printing dark box includes an exposing section and a transporting section by way of which the exposed printing paper is taken out from an exposing area in said exposing section, said exposing section essentially comprising a vertical printing paper guide plate with a large number of holes formed thereon, at least a pair of delivery rollers located above the exposing area, one of said delivery rollers being a driving roller adapted to be rotated by means of a stepping motor by way of a power transmission mechanism and the other one being a follower roller adapted to come in contact with said driving roller with the printing paper held therebetween, a part of said driving roller being projected forward of the vertical printing paper guide plate, at least a pair of discharge rollers located below the exposing area to hold the printing paper therebetween, at least a printing paper thrusting member, a plurality of suction fans disposed behind the vertical printing paper guide plate and a printing paper thrusting member actuating mechanism, said printing paper thrusting member being disposed on the vertical printing paper guide plate in such a manner as to slide upward or downward along a vertically extending guide grooves located at the central part of the vertical printing paper guide plate or at the position located symmetrically relative to the vertical center line of the same so that it is operated with the aid of said printing paper thrusting member actuating mechanism by way of the steps of thrusting down the printing paper to the predetermined position on the exposing area after it is introduced into the exposing section over the thrusting member, thrusting down it further after completion of exposing and printing to the position where it is caught by the pair of discharge rollers and then restoring the original position by being raised up, whereby the printing paper is firmly held in contact with the vertical printing paper guide plate under reduced pressure generated by the suction fans during exposing and printing whereas it is introudced into or taken out from the exposing area in the exposing section during introducing or after completion of exposing and printing of the printing paper.

6. A printer as claimed in claim 5, wherein said printing paper containing dark box includes a pair of delivery rollers for forwarding the printing paper into the exposing area in the exposing section, said pair of delivery rollers being adapted to rotate in operative association with the pair of delivery rollers on the vertical printing paper guide plate.

* * * * *